United States Patent
Eguchi et al.

(10) Patent No.: US 7,612,849 B2
(45) Date of Patent: Nov. 3, 2009

(54) LIQUID CRYSTAL DISPLAY DEVICE

(75) Inventors: Shingo Eguchi, Tochigi (JP); Yutaka Shionoiri, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 10/375,030

(22) Filed: Feb. 28, 2003

(65) Prior Publication Data

US 2003/0164912 A1 Sep. 4, 2003

(30) Foreign Application Priority Data

Mar. 1, 2002 (JP) ............... 2002-055874

(51) Int. Cl.
*G02F 1/1335* (2006.01)
(52) U.S. Cl. .............. 349/114; 349/106; 349/113
(58) Field of Classification Search .......... 349/106, 349/113, 114
See application file for complete search history.

(56) References Cited

U.S. PATENT DOCUMENTS

| | | | |
|---|---|---|---|
| 4,983,022 A | | 1/1991 | Shannon |
| 5,136,351 A | | 8/1992 | Inoue et al. |
| 5,193,017 A | | 3/1993 | Iwai et al. |
| 5,629,783 A | * | 5/1997 | Kanbara et al. ............. 349/70 |
| 5,753,937 A | | 5/1998 | Shimomaki et al. |
| 6,016,178 A | | 1/2000 | Kataoka et al. |
| 6,064,456 A | | 5/2000 | Taniguchi et al. |
| 6,097,459 A | | 8/2000 | Shimada et al. |
| 6,122,027 A | * | 9/2000 | Ogawa et al. ............. 349/113 |
| 6,195,140 B1 | | 2/2001 | Kubo et al. |
| 6,219,120 B1 | * | 4/2001 | Sasaki et al. ............. 349/113 |
| 6,278,508 B1 | | 8/2001 | Ogawa et al. |
| 6,295,109 B1 | | 9/2001 | Kubo et al. |
| 6,329,735 B1 | | 12/2001 | Tanaka et al. |
| 6,330,047 B1 | | 12/2001 | Kubo et al. |
| 6,373,540 B1 | * | 4/2002 | Munakata ............. 349/117 |
| 6,392,735 B1 | | 5/2002 | Tani |

(Continued)

FOREIGN PATENT DOCUMENTS

EP 0 829 748 3/1998

(Continued)

OTHER PUBLICATIONS

Second Office Action (Application No. 03119813.9; CN6265 dated Jan. 26, 2007), 23 pages.

*Primary Examiner*—David Nelms
*Assistant Examiner*—David Y Chung
(74) *Attorney, Agent, or Firm*—Fish & Richardson P.C.

(57) ABSTRACT

An object of the present invention is to provide a transflective liquid crystal display device having an excellent visibility obtained by optimizing the arrangement of a color filter, which would become a problem in the process of fabricating transparent and reflective liquid crystal display devices, for the transflective liquid crystal display device. In the present invention, the arrangement of a color filter is optimized for improving the visibility of the transflective liquid crystal display device. In addition, the structure, which allows the formation of color filters without increasing the capacitance that affects on a display, is fabricated. Furthermore, in the process of fabricating the transflective liquid crystal display device, an uneven structure is additionally formed without particularly increasing an additional patterning step for the formation of such an uneven structure.

18 Claims, 16 Drawing Sheets

U.S. PATENT DOCUMENTS

| | | | |
|---|---|---|---|
| 6,417,898 B1 | 7/2002 | Izumi | |
| 6,426,787 B1 | 7/2002 | Satake et al. | |
| 6,452,654 B2 | 9/2002 | Kubo et al. | |
| 6,563,559 B2 | 5/2003 | Noritake | |
| 6,618,107 B1 * | 9/2003 | Tanaka et al. | 349/106 |
| 6,639,639 B2 | 10/2003 | Baek et al. | |
| 6,649,936 B1 | 11/2003 | Sung et al. | |
| 6,657,688 B2 | 12/2003 | Nagata et al. | |
| 6,697,138 B2 * | 2/2004 | Ha et al. | 349/114 |
| 6,717,632 B2 | 4/2004 | Ha et al. | |
| 6,747,289 B2 | 6/2004 | Yamazaki et al. | |
| 6,784,957 B2 | 8/2004 | Kanou et al. | |
| 6,784,959 B2 | 8/2004 | Noritake | |
| 6,801,279 B2 | 10/2004 | Jang et al. | |
| 6,815,347 B2 | 11/2004 | Sumi et al. | |
| 6,819,379 B2 | 11/2004 | Kubo et al. | |
| 6,879,359 B1 | 4/2005 | Kikkawa et al. | |
| 6,912,021 B2 * | 6/2005 | Kimura | 349/69 |
| 6,950,159 B2 | 9/2005 | Kubo et al. | |
| 7,046,321 B2 | 5/2006 | Kikkawa et al. | |
| 7,053,969 B2 | 5/2006 | Yamazaki et al. | |
| 7,102,165 B2 | 9/2006 | Yamazaki | |
| 7,212,265 B2 | 5/2007 | Eguchi et al. | |
| 7,277,143 B2 | 10/2007 | Funahata et al. | |
| 2001/0020991 A1 | 9/2001 | Kubo et al. | |
| 2001/0026337 A1 | 10/2001 | Noritake | |
| 2001/0048496 A1 | 12/2001 | Baek | |
| 2001/0055082 A1 | 12/2001 | Kubo et al. | |
| 2003/0117552 A1 | 6/2003 | Chae | |
| 2003/0160922 A1 | 8/2003 | Noritake | |
| 2003/0164910 A1 | 9/2003 | Yamazaki et al. | |
| 2003/0164911 A1 | 9/2003 | Eguchi et al. | |
| 2004/0196419 A1 | 10/2004 | Kanou et al. | |
| 2004/0218120 A1 | 11/2004 | Ikeno et al. | |
| 2005/0018118 A1 | 1/2005 | Kubo et al. | |
| 2005/0270455 A1 | 12/2005 | Kubo et al. | |
| 2006/0197883 A1 | 9/2006 | Yamazaki et al. | |
| 2007/0001171 A1 | 1/2007 | Yamazaki | |
| 2007/0126959 A1 | 6/2007 | Eguchi et al. | |
| 2007/0189391 A1 | 8/2007 | Shinbata | |

FOREIGN PATENT DOCUMENTS

| | | |
|---|---|---|
| JP | 55-103583 | 8/1980 |
| JP | 61-024102 | 2/1986 |
| JP | 04-218977 | 8/1992 |
| JP | 06-148679 | 5/1994 |
| JP | 07-028073 | 1/1995 |
| JP | 08-78329 | 3/1996 |
| JP | 09-090352 | 4/1997 |
| JP | 09-146124 | 6/1997 |
| JP | 10-319430 | 12/1998 |
| JP | 11-101992 | 4/1999 |
| JP | 11-183892 | 7/1999 |
| JP | 11-281992 | 10/1999 |
| JP | 11-287989 | 10/1999 |
| JP | 2000-147493 | 5/2000 |
| JP | 2000-162590 | 6/2000 |
| JP | 2000-162625 | 6/2000 |
| JP | 2000-187209 | 7/2000 |
| JP | 2000-193996 | 7/2000 |
| JP | 2000-250067 | 9/2000 |
| JP | 2000-284305 | 10/2000 |
| JP | 2000-305099 | 11/2000 |
| JP | 2001-056466 | 2/2001 |
| JP | 2001-083494 | 3/2001 |
| JP | 2001-108984 | 4/2001 |
| JP | 2002-049057 | 2/2002 |
| JP | 2003-195349 | 7/2003 |
| JP | 2003-255374 | 9/2003 |

* cited by examiner

LIQUID CRYSTAL DISPLAY DEVICE

BACKGROUND OF THE INVENTION

1. Field of the Invention

The present invention relates to a passive- or active-matrix liquid crystal display device. Particularly, the present invention relates to an electrode structure of a transflective liquid crystal display device that possesses functional properties of both transparent and reflective liquid crystal display devices.

2. Description of the Related Art

In recent years, displays adaptable to changes in their use environments, power savings, and weight reductions have been desired for the explosive spread of handheld terminals, typified by cellular phones.

From the viewpoints of achieving the reduction in thickness and weight, a liquid crystal display (LCD) device or an organic electroluminescent (EL) display device may be of typically promising in the art.

A transparent liquid crystal display (LCD) device features its low power consumption only for actuating its display device. In this case, however, the liquid crystal itself does not emit light. Therefore, the liquid crystal needs backlighting when it is used in such a display device for providing information or graphics thereon. In uses for cellular phones, electroluminescent (EL) backlights are generally provided. However, such an EL backlight requires an additional amount of electric power. Therefore, it is difficult to take advantage of the characteristic power saving of the liquid crystal in a sufficient manner, so that the EL backlight has a disadvantage for a reduction in power consumption. Under the dark environment, a good contrast display can be viewed on the screen of the display device. Under the normal lighting environment, however, such a display cannot be viewed sufficiently. Therefore, the adaptability to different use environments is insufficient in case of either an upper output system or a lower output system.

Furthermore, the organic EL display device is characterized in that a display element itself emits light. The power consumption of the organic EL display device is higher than that of the reflective liquid crystal display device but smaller than that of the transparent liquid crystal device (with backlighting). Just as in the case of the transparent liquid crystal display device, a display can be viewed clearly on the screen of the display device under the dark environment. Under the normal lighting environment, however, such a display cannot be viewed sufficiently. Therefore, the adaptability to different use environments is insufficient in case of either the upper output system or the lower output system.

Furthermore, the reflective liquid crystal display device utilizes outside light from the environment as light for display. Therefore, principally, there is no need of backlighting on the display's side. In other words, power is only required for driving the liquid crystal and the driving circuit. Therefore, power saving can be positively attained. However, as opposed to the former display devices, a display can be clearly viewed under the lighting environment, but it cannot be clearly viewed under the dark environment. Considering the uses of the handheld terminals, they are mainly used outdoor and displays on their screens may be viewed under comparatively bright environments in most cases. In this case, however, the adaptability to different use environments is still insufficient. Therefore, front-lighting devices are installed in some of the commercially available handheld terminals such that they can be provided as reflective display devices capable of providing displays under the dark environments.

Consequently, attention is being given to a transflective liquid crystal display device because it is constructed as a combination of transparent and reflective liquid crystal display devices so as to have their advantageous features. Under the lighting environment, the transflective liquid crystal display device utilizes the power-saving property and the good visibility of the reflective type, while under the dark environment, it utilizes the good-contrasting property of the transparent type using the backlight.

The transflective liquid crystal display device is disclosed in Japanese Patent Laid-Open No. Hei 11-101992. In this document, there is disclosed a dual-use type (transflective type) reflective transparent liquid crystal display device integrated with a reflective part by which outside light is reflected and a transparent part through which light from the backlighting is transmitted on a single display pixel. When the device is in total darkness, it is functioned as a dual-use type liquid crystal display device where a display is viewed on the screen using light emitted from the backlighting and passed through the transparent part and light reflected from the reflective part formed by a film having a comparatively high reflectivity. When the device is well lighted with outside light, it is functioned as a reflective type liquid crystal display device where a display is viewed on the screen using light reflected from the reflective part formed by a film having a comparatively high reflectivity.

Furthermore, in the transflective liquid crystal display device, a specific uneven structure (e.g., projections and depressions) having a light-diffusing property is provided particularly on a reflective part that allows a reflective display on the screen. In the case of the reflecting electrode, because of the structural design thereof, the light incident on the surface of the reflecting electrode at a certain incident angle in a certain direction is confined such that the light can be only reflected from the electrode at a specific output angle in a specific direction (Snell's law). Therefore, the angle and direction of the output light is specifically defined with respect to those of the incident light when the surface of the reflecting electrode is flat. Any display device being produced under such conditions shows a display with an extremely poor visibility.

In the transparent and reflective liquid crystal display devices, furthermore, the placement of color filter is one of causes of parallax and blurred image.

For example, in the case of a transparent liquid crystal display panel as shown in FIG. 16A, it generally includes a first substrate (an device substrate) 1601 having a first electrode (a transparent electrode) 1602 provided as a pixel electrode, a second substrate (a counter substrate) 1603 having a second electrode (a transparent electrode) 1606 provided as a counter electrode, and a liquid crystal layer 1607, wherein a black matrixes (BMs) (1) 1604 and color filters 1605 are formed between the second substrate (the counter substrate) 1603 and the second electrode (the transparent electrode) 1606.

For attaining a higher resolution, compared with one shown in FIG. 16A, an alternative configuration of the LCD panel may be provided as shown in FIG. 16B.

In the transparent LCD panel, the BMs are assembled typically for hiding an escape of light caused by irregularities in the orientation of liquid crystal at the time of driving the liquid crystal. In the case of forming the BMs and the color filters on the side of the counter substrate, in general, the dimensions of the BM are defined so as to be slightly larger than the predetermined dimensions thereof within predetermined ranges as margins on the assumption that the device substrate and the counter substrate would be deviated within a predetermined range during the step of combining these substrates together in the process of forming liquid-crystal display devices.

Therefore, in the high-precision panel as shown in FIG. 16B, an opening portion (an opening portion (2)) is sacrificed to ensure the above margin (BM margin (2)), so that it would lead to a serius decrease in numerical aperture.

Therefore, as a method for solving the problem of a decrease in numerical aperture accompanied by an increase in resolution, it is considered to form color filters 1623 on the first substrate (the device substrate) 1621 as shown in FIG. 16C.

In the case of showing in FIG. 16C, there is no need to provide the BMs (3) with margins against the error of lamination, so that an opening portion (3) can be obtained without sacrificing the numerical aperture.

On the contrary, as shown in FIG. 17A, the configuration of the reflective liquid crystal display device publicly known in the art includes a first substrate (a device substrate) 1701 having a first electrode (a reflective electrode) 1702 provided as a pixel electrode; a second substrate (a counter substrate) 1703 having a second electrode (a transparent electrode) 1706 provided as a counter electrode, and a liquid crystal layer 1707, wherein black matrixes (BMs) (4) 1704 and color filters 1705 are formed between the second substrate (the counter substrate) 1703 and the second electrode (the transparent electrode) 1706. In this case, furthermore, the BMs (4) have the margins in consideration of an escape of light and the error of lamination between the first substrate (the device substrate) 1701 and the second substrate (the counter substrate) 1703, so that the dimensions of an opening portion can be restricted with the BM margins (4). In other words, the dimension of the opening portion can be represented as an opening portion (4) in the figure.

In this case, regarding the light (1) as shown in FIG. 17A, incident light and output light pass through the color filter formed on the same pixel. Regarding the light (2) and (3), on the other hand, incident light and output light pass through the color filters formed on the different pixels. In other words, the possibility of which the light passes through the color filters formed on the different pixels increases when the color filters are formed on the side of the counter substrate. In some cases, a problem of causing blurred images may arise.

Therefore, for solving such a problem of causing blurred images, as shown in FIG. 17B, a method of forming color filters 1714 on the first substrate (the device substrate) 1711 would be appropriate.

In FIG. 17B, there is illustrated a favorable method for preventing the generation of blurred images. In this case, an opening portion (not shown) can be formed without sacrificing the numerical aperture because of no need to provide the BMs (5) with margins to the error of lamination. Also, the ratio of which the incident light and the output light pass through the color filter formed on the same pixel increases, compared with that of FIG. 17A.

In this case, however, there is another problem of a decrease in effective applied voltage because of having a laminated structure obtained by laminating the liquid crystal layer 1717 and the color filter 1714 together and the color filter 1714 is formed as part of the capacitance of the pixel.

It may be said that the transflective liquid crystal display device is one that copes with a special usage condition named a handheld terminal. In particular, it is expected that great demand is anticipated by the application to cellar phones in future. For ensuring stable demand or addressing enormous demand, it is clear that there is the need of increasing activity of cost reduction.

However, for forming an uneven structure as described above, there is the need of providing a method in which a reflecting electrode is mounted after forming an uneven structure on a layer to be located below the reflecting electrode. In this process, for realizing such a configuration, the number of steps increases because of the need of patterning for forming the uneven structure. The increase in the number of the steps will cause disadvantageous situations including a decrease in yielding percentage, an extension of processing time, and cost increase.

Therefore, an object of the present invention is to provide a transflective liquid crystal display device having a reflective electrode with an uneven structure, which is formed without increasing the number of the steps in the process.

Furthermore, another object of the present invention is to provide a transflective liquid crystal display device having an excellent visibility by optimizing the arrangement of a color filter, which becomes controversial when the transparent or reflective liquid crystal display device is fabricated, for the transflective liquid crystal display device.

SUMMARY OF THE INVENTION

According to the present invention, for solving the above disadvantages, there is provided an uneven structure which is additionally formed without particularly increasing an additional patterning step for the formation of such a uneven structure in the process of fabricating a transflective liquid crystal display device.

According to the present invention, furthermore, there is provided a structure not only for optimizing the arrangement of a color filter to improve an excellent visibility of a transflective liquid crystal display device, but also for forming the color filter without increasing its capacitance that affects on a display.

An aspect of the present invention is to provide a liquid crystal display device comprising a plurality of island patterns formed on an insulating surface, a color filter formed on a plurality of island patterns, and a transparent conductive film formed on the color filter.

In the above configuration of the device, a plurality of island patterns may be formed by etching a reflective conductive film formed on the insulating surface. Furthermore, a plurality of island patterns are formed from the reflective conductive film, so that the plurality of island patterns have a function of reflecting the incident light.

In the present invention, the color filter may be formed so as to be sandwiched between a plurality of island patterns and a transparent electrode made of the transparent conductive film. Therefore, it is possible to prevent a positional displacement at the time of displaying light passing through the color filter by the desired pixels, compared with the conventional liquid crystal display shown in FIG. 17, either in the case of reflective display by a plurality of island patterns or in the case of the display by a transparent electrode.

In the transflective liquid crystal device of the present invention, when a plurality of island patterns and the transparent electrode are formed on a position where they are overlapped through the color filter, light can be reflected on a plurality of island patterns. On the other hand, when a plurality of island patterns are formed on a position where it cannot be overlapped with the transparent electrode through the color filter, light passes through the transparent electrode.

Consequently, the structure of the present invention has two types of characteristics, reflectivity and transparency. In addition, it also has an ability of forming an uneven structure on a portion having a reflectivity.

In addition, the reflective conductive film may be a conductive film having a reflectivity of 75% or more with respect to a vertical reflection property at a wavelength of 400 to 800 nm (in the visible region).

Another aspect of the present invention is to provide a liquid crystal display device comprising a thin film transistor formed on a substrate, a wiring and a plurality of island patterns, prepared by etching the reflective conductive film, which are formed on the thin film transistor through an insulating film, a color filter formed on a plurality of island patterns, and a transparent conductive film formed on the color filter, wherein the wiring establishes an electrical connection between the thin film transistor and the transparent conductive film.

In each of the above configurations, when a plurality of island patterns made of the reflective conductive film and the wiring are simultaneously etched together, the number of steps in the process of photolithography to be generally used for the formation of an uneven structure can be reduced. Therefore, an extensive cost reduction and an increase in yields can be attained.

Furthermore, the formation and arrangement of a plurality of island patterns are performed in a random fashion. However, it is preferable that the island pattern formed by etching the reflective conductive film may be processed such that a taper angle of an end portion of the pattern is more decreased to improve the function of reflection.

In the pixel portion, a percentage of an area occupied by a plurality of island patterns made of the transparent conductive film may be 50 to 90% of an area occupied by the pixel portion.

In addition, the transparent electrode formed on the color filter may be formed so as to be connected to the previously formed wiring.

Another aspect of the present invention is to provide a liquid crystal display device comprising a first substrate, a wiring and a plurality of island patterns prepared by etching a reflective conductive film formed on an insulating surface over the first substrate, a color filter formed on the plurality of island patterns, a first transparent conductive film formed on the color filter, a second substrate having a second transparent conductive film, and a liquid crystal, wherein the first transparent conductive film and the wiring are electrically connected to each other, a film-formed surface of the first substrate and a film-formed surface of the second surface face to each other, and the liquid crystal is sandwiched between the first substrate and the second substrate.

Furthermore, still another aspect of the present invention is to provide a liquid crystal display device, comprising, a first substrate, a thin film transistor formed on the first substrate, a wiring and a plurality of island patterns prepared by etching a reflective conductive film, which are formed over the thin film transistor through an insulating film, a color filter formed over the plurality of island patterns, a first transparent conductive film formed on the color filter, a second substrate having a second transparent conductive film, and a liquid crystal, wherein the wiring establishes an electrical connection between the thin film transistor and the first transparent conductive film, a film-formed surface of the first substrate and a film-formed surface of the second surface face to each other, and the liquid crystal is sandwiched between the first substrate and the second substrate.

According to the present invention, the color filter is formed on the island patterns formed by etching the reflective conductive film formed over the first substrate, and the liquid crystal is formed so as to be sandwiched between the first substrate having the transparent conductive film formed over the color filter and the second substrate having a counter electrode, with directing their film-formed surfaces inside. Thus, there is provided a structure where the transparent electrode is sandwiched between the color filter made of an insulating material and the liquid crystal, so that the formation of capacitance by the color filter can be decreased.

DETAILED DESCRIPTION OF THE DRAWINGS

Figure 1:
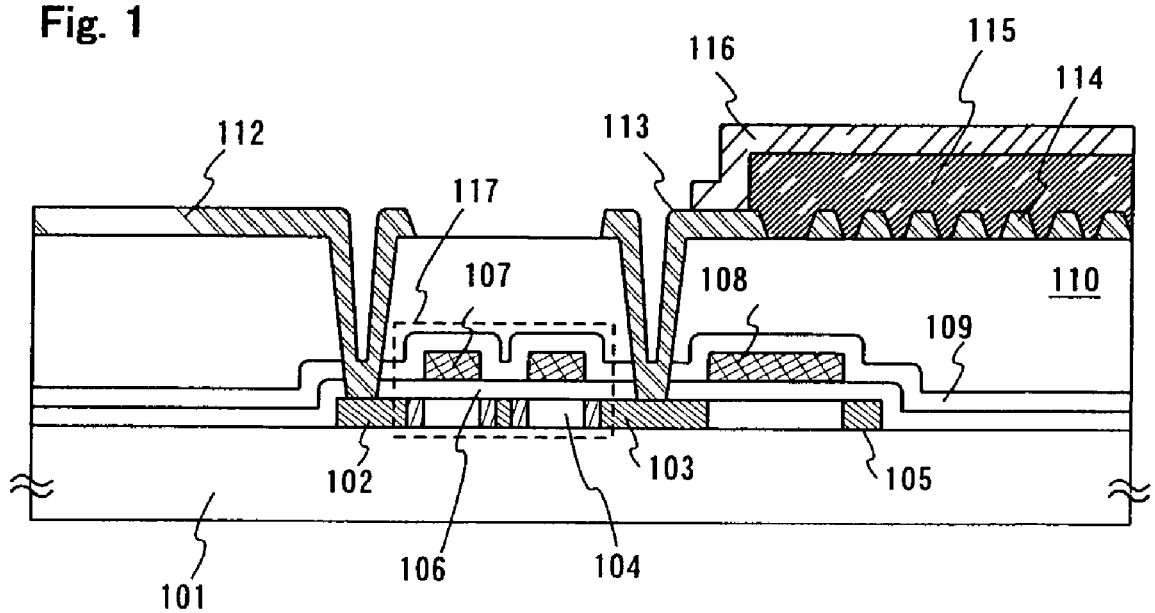
FIG. 1 is a diagram for illustrating a device structure of a liquid crystal display device in accordance with the present invention.

A preferred embodiment of the present invention will be described with reference to FIG. 1. A semiconductor layer 105 is formed on a substrate 101. The semiconductor layer 105 is formed using a polycrystal semiconductor layer which is prepared by crystallizing an amorphous semiconductor layer by a heat treatment. In this embodiment, the semiconductor layer 105 is formed as one having a thickness of about 30 to 750 nm. Furthermore, a gate insulating film 106 is formed on the semiconductor layer 105. Here, the gate-insulating film 106 is formed from a silicon oxide layer having a thickness of 30 to 100 nm.

Furthermore, a gate electrode 107 and a capacitor wiring 108 are formed from the same layer on the gate insulating film 106. In addition, a first insulating film 109 including a silicon oxide film and a second insulating film 110 including an acryl film are further formed over the gate insulating film 106. Silicon-containing inorganic materials such as a silicon nitride film, a silicon-nitride-oxide film, and a coating silicon oxide film (SOG: Spin On Glass) can be used as materials to be formed as the first insulating film 109 instead of the silicon oxide film. In addition, organic materials such as polyimide, polyamide, and BCB (benzocyclobutene) can be used as the second insulating film 110 instead of the acryl film (including photosensitive acryl).

The wiring 112 is an electrode that makes a contact with a source region 102 of a thin film transistor (TFT) 117, which is also a source wiring. In addition, the wiring 113 is an electrode that makes a contact with a drain region 103 of the TFT 117.

In the semiconductor layer 105, the source region 102, the drain region 103, and a channel-forming region 104 are formed. In addition, the semiconductor layer 105 formed in the position overlapped with the capacitance 108, except the source region 102 and the drain region 103, functions as one electrode of the capacitance element.

Furthermore, reflectors 114 of a plurality of island patterns are formed from the same film as a conductive film which forms the wirings 112, 113. In other words, the reflectors 114 have a structure like islands being formed with irregular shapes and arrangement so as to have a function of scattering light incident on the surfaces of the reflectors 114.

Figure 2A:
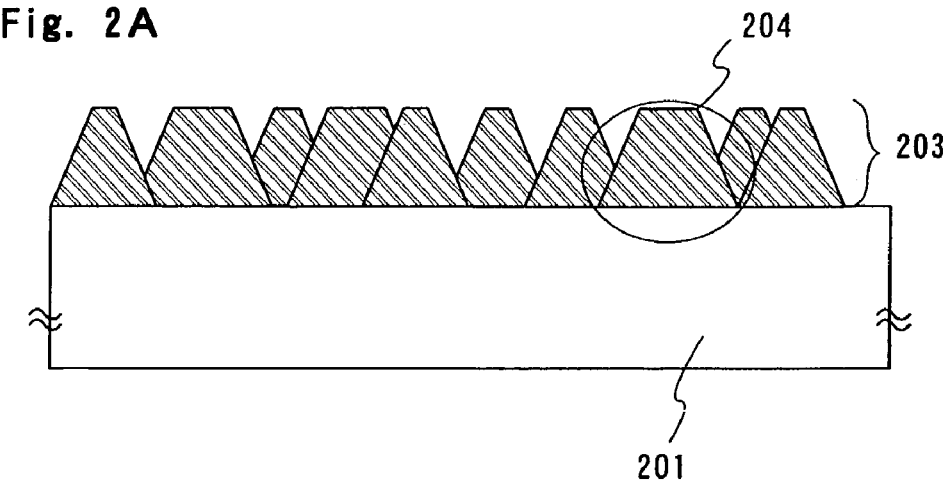
FIGS. 2A to 2D are diagrams for illustrating the structure of reflectors in accordance with the present invention.

Furthermore, the reflectors formed in the present invention have irregular shaped island patterns and the island patterns thereof are irregularly positioned as shown in FIG. 2A in order to scatter light by shifting an angle of light incident on the reflectors 204 (an incident angle) from an angle of light reflected from the reflectors (reflective angle).

Figure 2B:
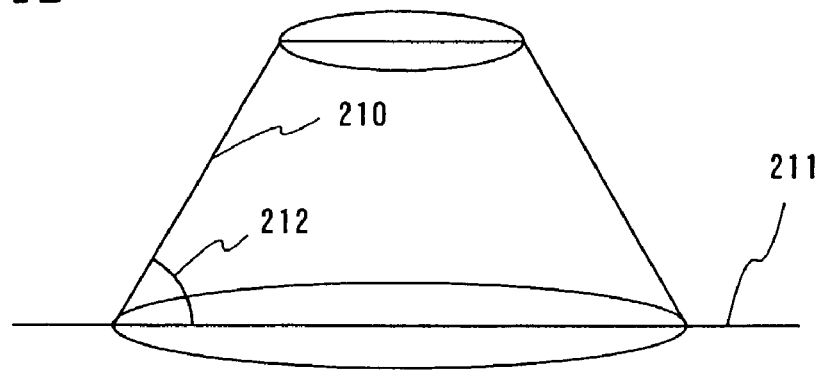

In the present invention, furthermore, a matter of importance for the shift of the incident angle and the reflective angle is the shape of each island pattern of the reflectors constituting the reflective electrode. In FIG. 2B, the angle which shows how much a tapere-slope surface (a reflective surface) 210 of each refrector island is inclined with respect to the surface of the substrate (a standard surface) 211. Here, such an angle is defined as a taper angle ($\theta$) 212.

In this embodiment, the reflector is formed such that the taper angle ($\theta$) 212 is included in the range of 5 to 60°. Therefore, it is possible to improve the visibility of the panel by scattering light with sifting an output angle with respect to the taper-slope surface (the reflective surface) 210 of the taper from an output angle with respect to the surface of the substrate (the standard surface) 211.

Figure 2C:
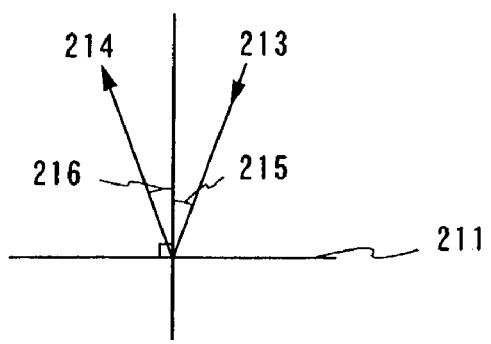

FIG. 2C shows behaviors of the incident light 213 and the reflective light 214 with respect to the reflective surface without slope, respectively. In the figure, "$a_{in}$" denotes an incident direction with respect to the standard surface 211, "$a_{out}$" denotes an output direction with respect to the standard surface 211, "$a'_{in}$" denotes an incident direction with respect to the reflective surface 210, and "$a'_{out}$" denotes an output direction with respect to the reflective surface 210. In addition, the incident angle ($\theta_1$) 215 and the output angle ($\theta_2$) 216 are defined with respect to the standard surface. Here, the standard surface 211 and the reflective surface 210 are consistent with each other, so that the equations $a_{in}=a'_{in}=\theta_1$ and $a_{out}=a'_{out}=\theta_2$ are established.

Also, Snell's law gives $a'_{in}=a'_{out}$, so that $a_{in}=a_{out}$ and $\theta_1=\theta_2$ are established.

Figure 2D:
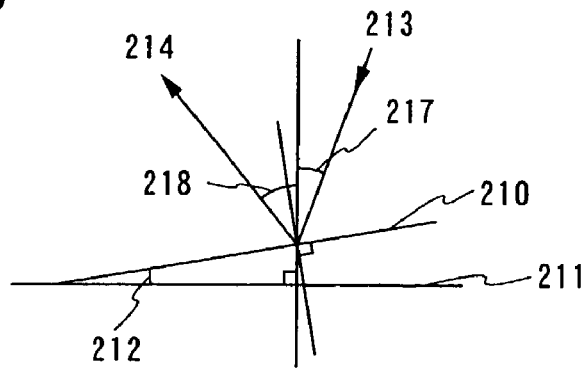

On the other hand, FIG. 2D shows the behaviors of the incident light 213 and the output light 214, respecdtively, when the tapered surface inclined at a taper angle ($\theta$) 212 is provided as a reflective surface.

The incident light 213 and the output light 214 with respect to the standard surface 211 are given by $a_{in}=\phi_1'$ and $a_{out}=\phi_2'$, or $a'_{in}=\phi_1'+\theta$ and $a'_{out}=\phi_2'-\theta$ wherein $\phi_1'$ denotes an incident angle 217 and $\phi_2'$ denotes an output angle 218.

In addition, Snell's law gives $a'_{in}=a'_{out}$, so that the equation: $\phi_1'+\theta=\phi_2'-\theta$ is given. From the equation, the relationship between the incident angle ($\phi_1'$) 217 and the output angle ($\phi_2'$) 218 can be defined as $\phi_2'-\phi_1'=2\theta$. It means that the incident direction ($a_{in}$) of the incident light 213 and the output direction ($a_{out}$) of the output light 214 are shifted from each other by the degree of $2\theta$.

For fabricating a panel having an excellent visibility, it is preferable that the shift angle ($2\theta$) may be uniformly distributed in the range of 40° or less. Therefore, it is further preferable that the reflectors 204 may be formed so as to have a tapered angle ($\theta$) 212 of 20° or less.

In the present embodiment, the taper angle ($\theta$) 212 of the reflectors 204 (114 in FIG. 1) is defined in the range of 5 to 60°, so that light incident on the reflectors 204 can be efficiently scattered. Therefore, the structure of the present invention is capable of improving the visibility of a display without increasing the number of steps in the process of fabricating the TFT.

Next, as shown in FIG. 1, a color filter 115 is formed on reflectors 114, and a transparent electrode 116 is then formed on the color filter 115. Furthermore, the transparent electrode 116 is an electrode for allowing the incident light to pass through the electrode 116 toward the side of substrate 101. As a material to be used for preparing the transparent electrode 116, a transparent conductive film of 100 to 200 nm in film thickness, which is prepared of an indium tin oxide (ITO) film or an indium oxide film with 2 to 20% of zinc oxide (ZnO), may be provided. Such a transparent conductive film is further subjected to the step of patterning to form the transparent electrode 116 for each pixel.

In the structure of the present invention, the light incident on the reflectors 114 after passing through the transparent electrode 116 is scattered depending on the shapes of the reflectors 114. On the other hand, the light incident into the space between adjacent reflectors 114 without incident on the surface of the reflectors 114 is emitted toward the substrate 101.

Therefore, the structure of the present invention is capable of forming the reflectors for scattering light without increasing the number of steps in the process of fabricating TFT, thus improving the visibility of a display. In addition, the structure of the present invention is also capable of solving the problem of positional sift caused by the arrangement of a color filter, which arises in both the transparent and reflective liquid crystal displays, and also preventing an increase in capacitance to be caused by the arrangement of a color filter.

Furthermore, as explained in the above embodiment of the present invention, a transflective liquid crystal display device can be fabricated by combining a device substrate (FIG. 1) having TFTs thereon and a counter substrate (not shown) having a counter electrode thereon together, while placing liquid crystal between these substrate.

EXAMPLES

Hereinafter, we will describe the examples of the present invention.

Example 1

In this example, there is shown an exemplified method for fabricating an active matrix substrate having a top-gate type thin film transistor (TFT). Here, the example will be described with reference to FIGS. 3A to 7, which are top or cross-sectional views of a part of a pixel portion.

At first, an amorphous semiconductor layer is formed on a substrate 301 having an insulating surface. Here, a quartz substrate is used as the substrate 301, and an amorphous semiconductor layer with a film thickness of 10 to 100 nm is formed on the substrate 301.

Furthermore, the substrate 301 is not limited to the quartz substrate. Alternatively, the substrate 301 may be prepared using a glass substrate or a plastic substrate. In the case of using the glass substrate, it is preferable that the glass substrate is subjected to a heat treatment in advance at a temperature about 10 to 20° C. lower than the strain point of the glass substrate. In addition, a base film may be preferably formed on the surface of the substrate 301 on which TFT is to be formed. The base film may be including an insulating film such as a silicon oxide film, a silicon nitride film, or a silicon oxynitride film to prevent impurities from diffusing into the substrate 301.

As the amorphous semiconductor layer, an amorphous silicon film of 60 nm in film thickness is formed using a low pressure chemical vapor deposition (LPCVD) method. Then, the amorphous silicon semiconductor layer is crystallized. In this example, the crystallization is performed using a technology described in Japanese Patent Laid-Open No. Hei 8-78329. The technology described in this patent application publication, a metal element that facilitates the crystallization is selectively added in the amorphous silicon film, followed by subjecting the amorphous semiconductor film to a heat treatment to form a crystalline silicon film that spreads from the area being added with the above metal element as a starting point. Here, nickel is used as the metal element that facilitates the crystallization. A heat treatment for the crystallization (600° C. for 12 hours) is performed after a heat treatment for dehydrogenation (450° C. for 1 hour). Here, it is noted that the crystallization is not limited to one disclosed in the above patent application publication. Alternatively, any crystallization method publicly known in the art may be used (e.g., a laser crystallization or a thermal crystallization).

If required, laser beam (XeCl: wavelength 308 nm) is irradiated to increase the rate of crystallization for repairing the defects remained in crystal grains. The laser beam to be used may be excimer laser beam with a wavelength of 400 nm or less, or the second or third harmonic of YAG laser. In either case, a pulse laser beam with a repetitive frequency of about 10 to 1000 Hz may be used. The laser beam may be converged through an optical system at a density of 100 to 400 mJ/cm$^2$. Subsequently, the laser beam may be irradiated with an overlap rate of 90 to 95% for scanning over the surface of the silicon film.

Next, gettering Ni is performed in the area provided as an active layer of TFT. In the following description, an example of using a semiconductor layer containing a rare gas element for gettering. In addition to the oxide film formed by the irradiation of laser beam, a barrier layer formed from a oxide film with a total thickness of 1 to 5 nm by treating the surface thereof with ozone water for 120 seconds. Subsequently, an amorphous silicon film containing argon with film thickness of 150 nm, which will become a gettering site, is formed on the barrier layer by a sputtering method. In this example, the sputtering for the film formation may be performed under the conditions of a pressure of 0.3 Pa for film formation, a gas (Ar) flow rate of 50 sccm, an electric power of 3 kW, and a substrate temperature of 150° C. By the way, in the amorphous silicon film under the above conditions, an atomic percentage of argon is in the range of $3\times10^{20}$ to $6\times10^{20}$ atom/cm$^3$, an atomic percentage of oxygen is in the range of $1\times10^{19}$ to $3\times10^{19}$ atom/cm$^3$. After that, the gettering is performed by a thermal treatment using a lamp anneal apparatus at 650° C. for 3 minutes. Alternatively, an electric furnace may be used instead of the lamp anneal apparatus.

Next, the barrier layer is used as an etching stopper to selectively remove the amorphous silicon film containing Ar of the gettering site, followed by selectively removing the barrier layer with a dilute hydrofluoric acid treatment. Here, nickel (Ni) atoms tend to move to the oxygen-rich area at the time of gettering, so that it is preferable to remove the barrier layer made of the oxide film.

A thin oxide film is formed on the surface of the silicon film having the obtained crystalline structure (also referred to as a polysilicon film) by the application of ozone water. After that, a mask made of a rest is formed on the above film, followed by subjecting the silicon film to an etching treatment to form a semiconductor layers 305 formed from a plurality of separated islands with desired patterns. Then, the mask is removed after completing the semiconductor layer 305. Subsequently, a gate insulating film 306 of 100 nm in thickness is formed over the surface of the semiconductor layer 305, followed by thermal oxidation.

Furthermore, the step of channel-doping is performed all over or selectively, by which a small amount of p type or n type impurity element is doped in an area to be provided as a channe-forming region of TFT. Such a channel-doping is a step for controlling a threshold voltage of TFT. Here, it is known that the impurity elements capable of making the semiconductor into p-type are those found in Group 13 of the periodic table, such as boron (B), aluminum (Al), and gallium (G), while the impurity elements capable of making the semiconductor into n-type are those found in Group 15 of the periodic table, typically phosphorus (P) and arsenic (As). In this example, boron is doped by means of an ion-doping method with a plasma excitation of diboran ($B_2H_6$) without mass separation. Alternatively, it may be doped by means of an ion implantation method with mass separation.

Subsequently, a first conductive film is formed and is then patterned to make a gate electrode 307 and a capacitor wiring 308 thereon. Here, a laminate structure including tantalum nitride (TaN) (30 nm in thickness) and tungsten (W) (370 nm in thickness) is used. In this example, furthermore, the TFTS are provided with a double gate structure. Besides, the holding capacitor is constituted of the capacitor wiring 308 and a region "a" (305a), which is a part of the semiconductor layer 305, using the gate insulating film 306 as a dielectric.

Then, a low concentration of phosphorus is added to a desired region in a self alignment manner using the gate electrode 307 and the capacitiance wiring 308 as a mask. In this case, the concentration of phosphorus added in the region is adjusted within the range of $1\times10^{16}$ to $5\times10^{18}$ atom/cm$^3$, typically $3\times10^{17}$ to $3\times10^{18}$ atom/cm$^3$.

Subsequently, a mask (not shown) is formed and a high concentration of phosphorus is doped to form impurity regions with a high concentration to be provided as a source region 302 and a drain region 303, respectively, while adjusting the concentrations of phosphorus in the respective impurity regions with a high concentration within the range of $1\times10^{20}$ to $1\times10^{20}$ atom/cm$^3$ (typically, $2\times10^{20}$ to $5\times10^{20}$ atom/cm$^3$). Furthermore, a part of the semiconductor layer 305, which is overlapped with the gate electrode 307, is provided as a channel-forming region 304. In addition, another part thereof, which is covered with the mask, is provided as a lightly doped drain (i.e., a LDD region) 311. Furthermore, other areas of the semiconductor area 305, which are not covered with any one of the gate electrode 307, the capacitor wiring 308, and the mask, are provided as impurity regions with high concentrations including the source region 302 and the drain region 303.

In this example, TFT of the pixel portion and TFT of the driving circuit are formed on the same substrate. In the TFT of the driving circuit, lightly doped drains may be formed on both sides of the channel-forming region between the drain region and the source region. In the lightly doped drains, the concentration of the impurity is smaller than those of source and drain regions. However, there is no need to provide the lightly doped drains on the both sides. A manufacturer may appropriately design any mask according to need. For instance, such a lightly doped drain may be alternatively formed only one side of the channel-forming region.

Subsequently, although not shown in the figure, in order to form a p-channel type TFT to be used in the driving circuit formed on the same substrate as the pixel, a source region or a drain region is formed by covering an area to be provided as an n-channel type TFT with a mask and doping boron (B).

Figure 3A:
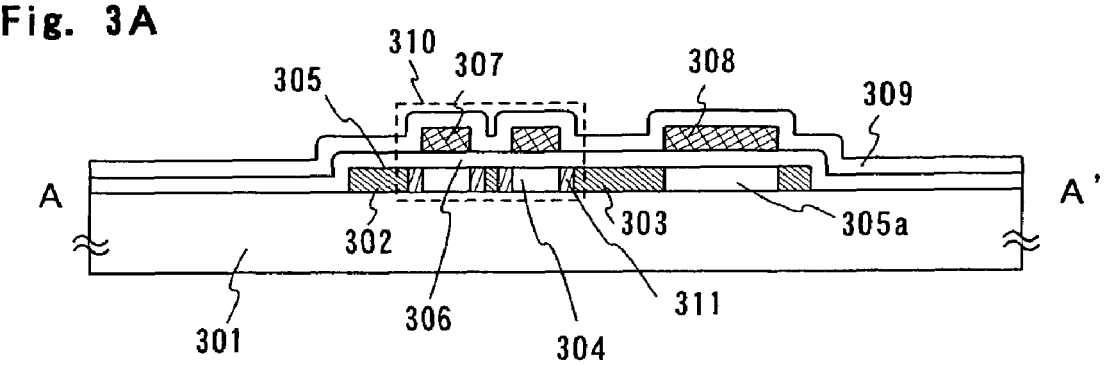
FIGS. 3A to 3D are diagrams for illustrating the steps in the process of fabricating a liquid crystal display device of the present invention.
Figure 4:
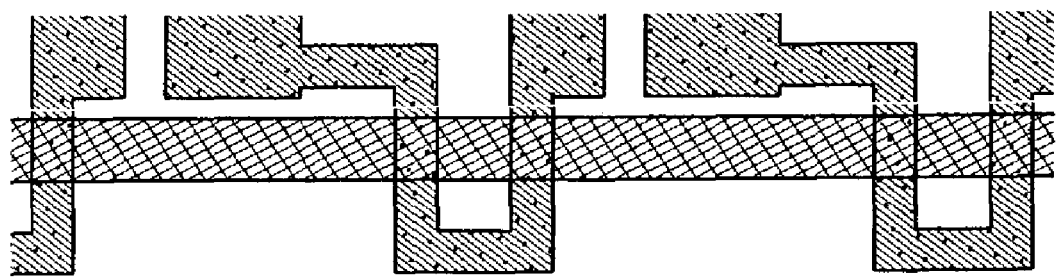
FIG. 4 is a diagram for illustrating a process of fabricating a liquid crystal display device of the present invention.
Figure 4:
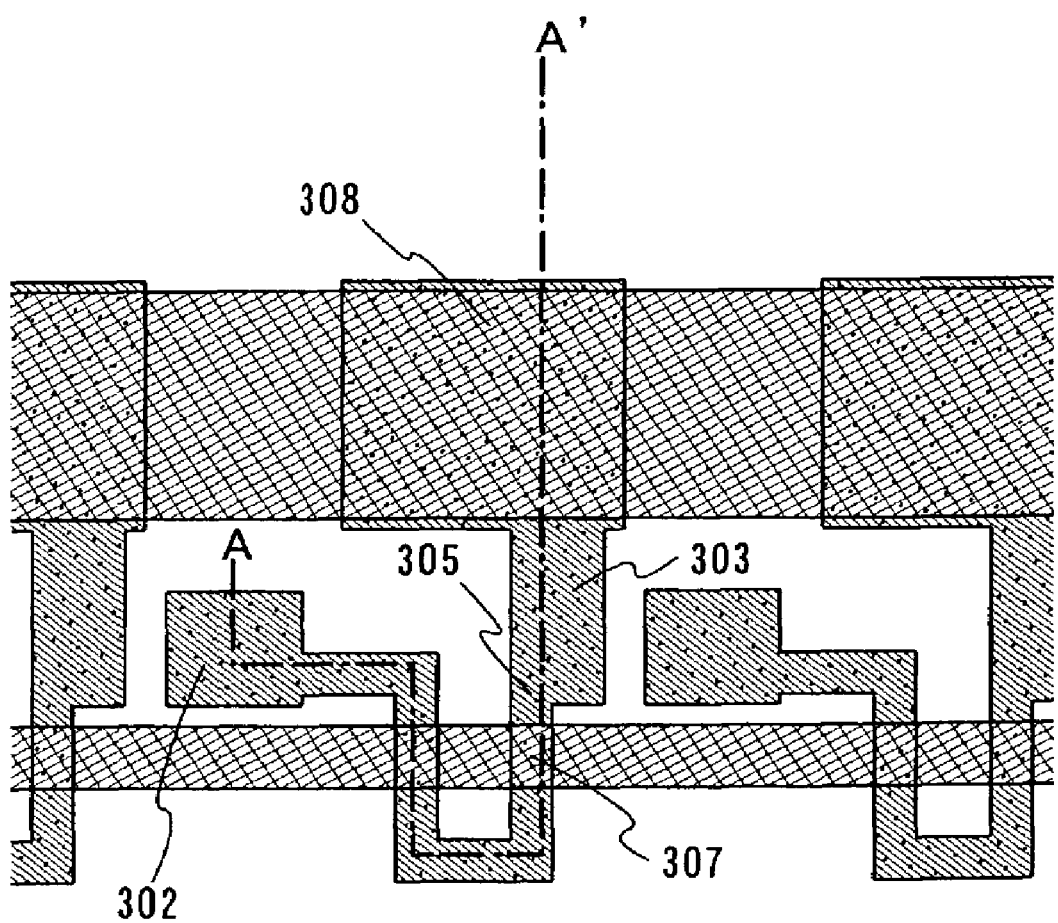

After removing the mask, a first insulating film 309 is formed over the gate electrode 307 and the capacitor wiring 308. Here, a silicon oxide film of 50 nm in film thickness is formed and is then subjected to the step of a thermal treatment to activate n or p type impurity element being doped to the semiconductor layer 305 at each concentration thereof. In this example, the thermal treatment is carried out at a temperature of 850° C. for 30 minutes (FIG. 3A). Here, the top view of the pixel portion is shown in FIG. 4. The cross-sectional profile of the pixel portion along the dotted line A-A' in FIG. 4 corresponds to the structure shown in FIG. 3A.

Figure 3B:
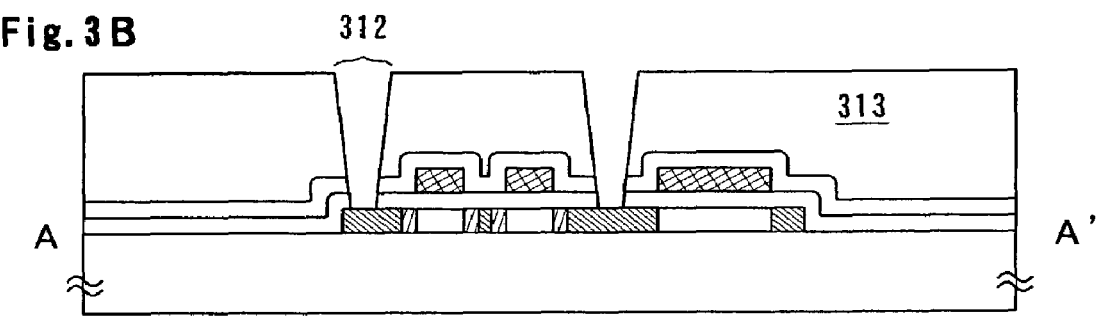
Figure 5:
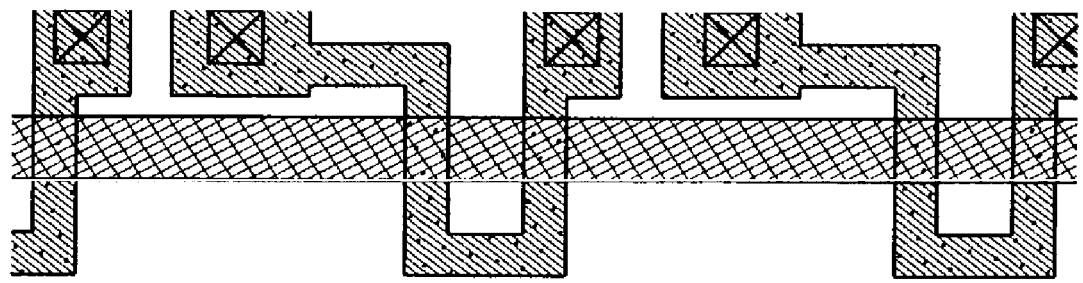
FIG. 5 is a diagram for illustrating a process of fabricating a liquid crystal display device of the present invention.
Figure 5:
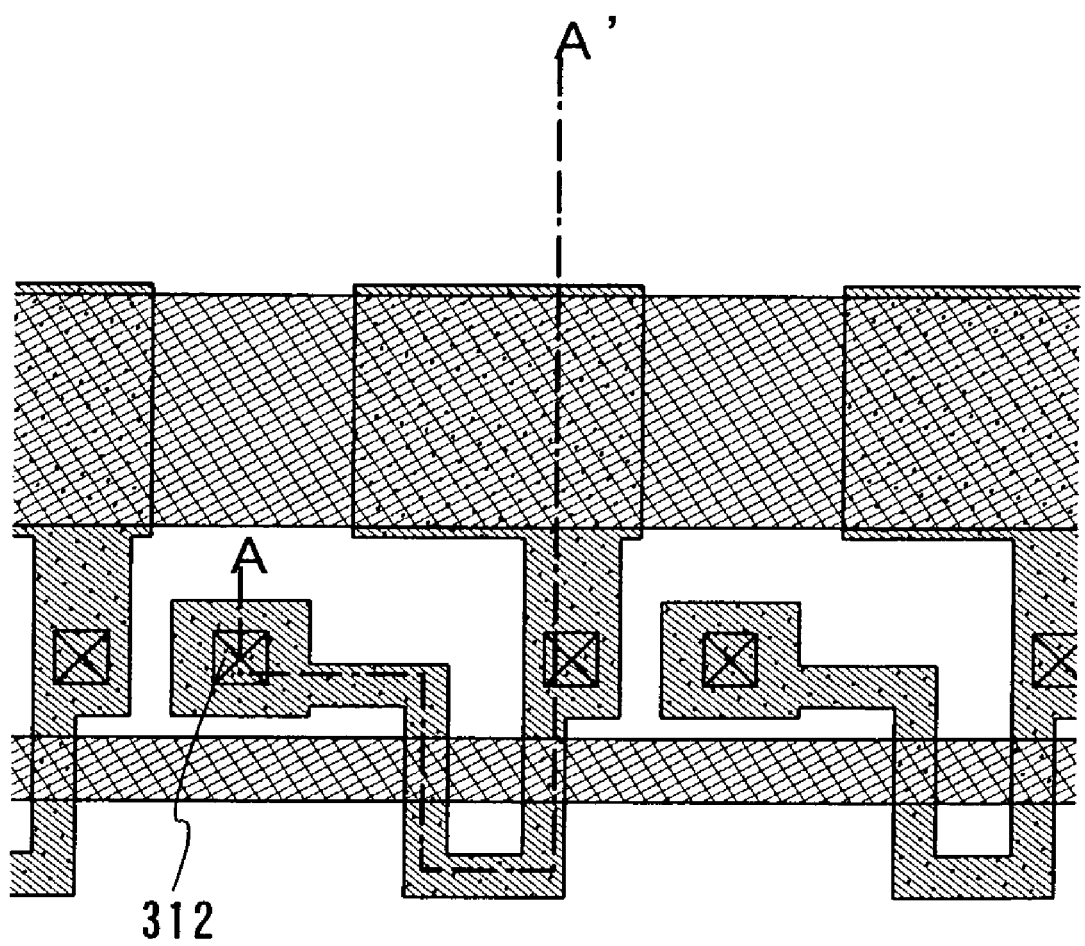

Next, a hydrogenation treatment is performed, followed by forming a second insulating film 313 made of an organic resin material. In this example, the surface of the second insulating film 313 can be flattened by means of an acryl film of 1 μm in film thickness. An influence of unevenness caused by the pattern formed on the layer under the second insulating film 313 can be prevented. Subsequently, a mask is formed on the second insulating film 313 to form contact holes 312 extending to the semiconductor layer 305 (FIG. 3B). After the formation of contact holes 312, the mask is removed. Here, the top view of the pixel portion is shown in FIG. 5. The cross-sectional profile of the pixel portion along the dotted line A-A' in FIG. 5 corresponds to the structure shown in FIG. 3B.

Next, a second conductive film is formed and is then pattered to form a wiring 315 including a source wiring and a wiring 316 including a drain wiring (concretely, wiring electrically connecting the TFT 310 and a transparent electrode to be formed later) in addition to reflectors 314. The second conductive film being formed here is a reflective conductive film to be used for forming the reflectors in the present invention. Preferably, the second conductive film may be prepared using aluminum, silver, or the like, or an alloy material mainly comprising these elements.

The second conductive film used in this example is a laminated film which is prepared as a two-layer structure including a Ti film of 50 nm in thickness and a aluminum film of 500 nm in thickness containing Si being sequentially deposited by a spattering method.

Here, the patterning is performed using a photolithography to form reflectors 314 having a plurality of island patterns and wirings 315 and 316. In addition, the etching method used herein is dry etching to perform taper-etching and anisotropic-etching.

At first, a resist mask is formed, and then a fist etching treatment is performed for the taper-etching. In the first etching treatment, the first and second etching conditions are applied. Preferably, the etching itself may be an inductively coupled plasma (ICP) etching method. The ICP etching method allows the film to be shaped into a desired tapered configuration by appropriately adjusting the etching conditions (an electric power to be applied to a coil type electrode, an electric power to be applied to an electrode on the substrate's side, a temperature of the substrate's side, and so on). Here, the etching gas may be appropriately selected from chlorine gases typified by, for example, $Cl_2$, $BCl_3$, $SiCl_4$, and $CCl_4$ and fluorine gases typified by, for example, $CF_4$, $SF_6$, and $NF_3$. Alternatively, $O_2$ may be appropriately used.

In the present example, as the fist etching condition, the ICP etching method is used. In this case, $BCl_3$, $Cl_2$, and $O_2$ are used as etching gases and a gas-flow ratio is 65/10/5 (sccm), pressure is 1.2 Pa, and a RF power of 500 W (13.56 MHz) is applied on the coil type electrode to generate plasma by which the etching can be performed. In addition, an RF power of 300 W (13.56 MHz) is applied on the substrate's side (on a sample stage) to apply a substantially negative self bias current. The first etching condition allows the aluminum film containing Si to be etched to make the end of the first conductive layer into a taper shape.

After that, the etching condition is changed from the first one to the second one. Furhter an etching for about 30 seconds is performed with remaining the mask as it is, under the second etching condition with $CF_4$, $Cl_2$, and $O_2$ as the etching gases, a gas-flow ratio of 25/25/10 (sccm), a pressure of 1 Pa, and an RF power of 500 W (13.56 MHz) applied to the coil type electrode to generate plasma. In addition, an RF power of 20 W (13.56 MHz) is applied on the substrate's side (on a sample stage) to apply a substantially negative self-bias current. Under the second etching condition in which $CF_4$ and $Cl_2$ are mixed together, the aluminum film containing Si and the Ti film can be etched at the same degree.

Consequently, the second conductive film composed of the first and second conductive layers is shaped into a tapered configuration by the first etching treatment.

For performing the anisotropic etching, furthermore, the second etching treatment is performed with remaining the resist mask as it is. Here, $BCl_3$ and $Cl_2$ are used as the etching gases, a gas-flow ratio is 80/20 (sccm), pressure is 1 Pa, and an RF power of 300 W (13.56 MHz) is applied on the coil type electrode to generate plasma, thereby the second etching is performed. In addition, an RF power of 50 W (13.56 MHz) is applied on the substrate's side (on a sample stage) to apply a substantially negative self-bias voltage.

Figure 3C:
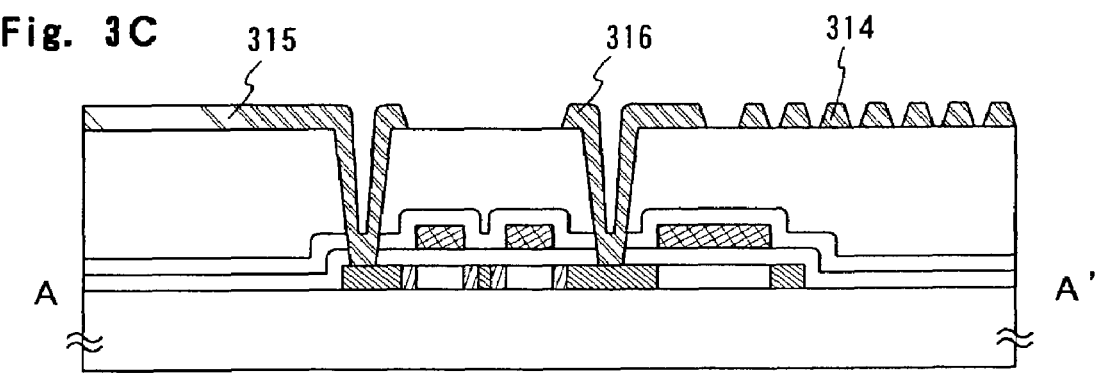
Figure 6:
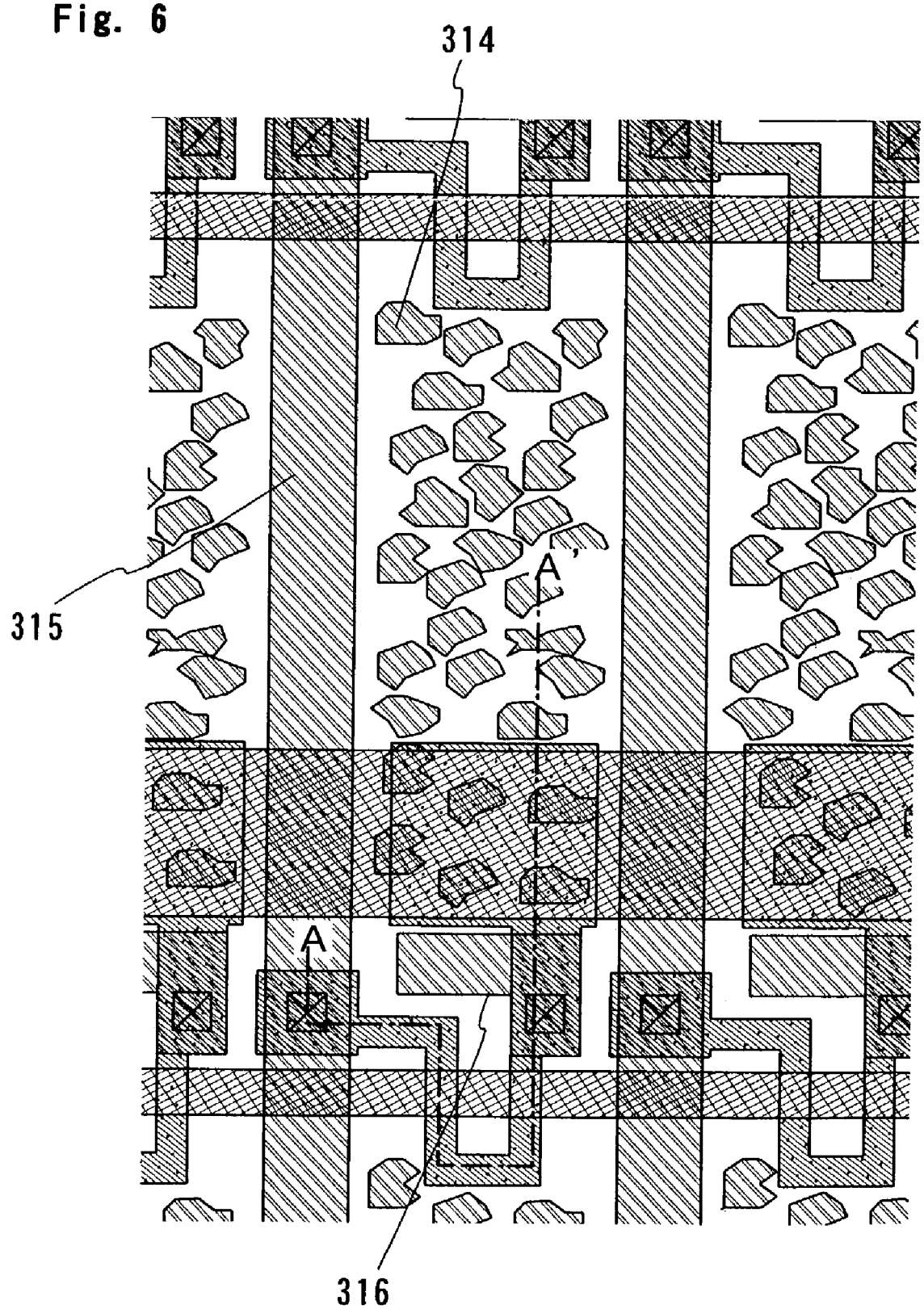
FIG. 6 is a diagram for illustrating a process of fabricating a liquid crystal display device of the present invention.

Consequently, the resist is removed when the formation of the reflectors 314 and the wirings 315, 316 is completed, resulting in the structure shown in FIG. 3C. Here, the top view of the pixel portion is shown in FIG. 6. The cross-sectional profile of the pixel portion along the dotted line A-A' corresponds to the structure shown in FIG. 3C.

Next, the color filter 317 is formed on the reflectors 314. The formation of the color filter 317 can be performed using materials publicly known in the art. In this embodiment, these materials are applied on the reflectors 314 by means of a spin coating to form the color filter with a film thickness of 1 μm, followed by a preliminary curing on a hot plate at 80° C. for 5 minutes. Then, the substrate is exposed to light by a photolithography using a photo mask. After the exposure, the substrate is dipped into a developing solution and is then shaken for the development. The developing solution used is an aqueous solution of 0.2% tetramethylammonium hydroxide. After being dipped for about 1 minute, the substrate is washed in flowing water. Here, a high-pressure jet washing is able to remove the residue of the color filter, completely. The color filter, furthermore, is formed on the source wiring and an effective opening portion of the corresponding pixel. In addition, the color filter is arranged such that it is not placed on the drain wiring 316 that is responsible for making an electrical connection between the TFT in the lower layer and the pixel electrode in the upper layer.

After that, when an excellent formation of the pattern has confirmed, then it is subjected to actual baking in a clean oven at 250° C. for 1 hour. It is not shown in the figure, however, the above steps are performed for three different color filters for the respective colors, red, blue, and green.

Furthermore, after the formation of color filters for three colors, an overcoat material (not shown) may be applied over the color filters.

Figure 3D:
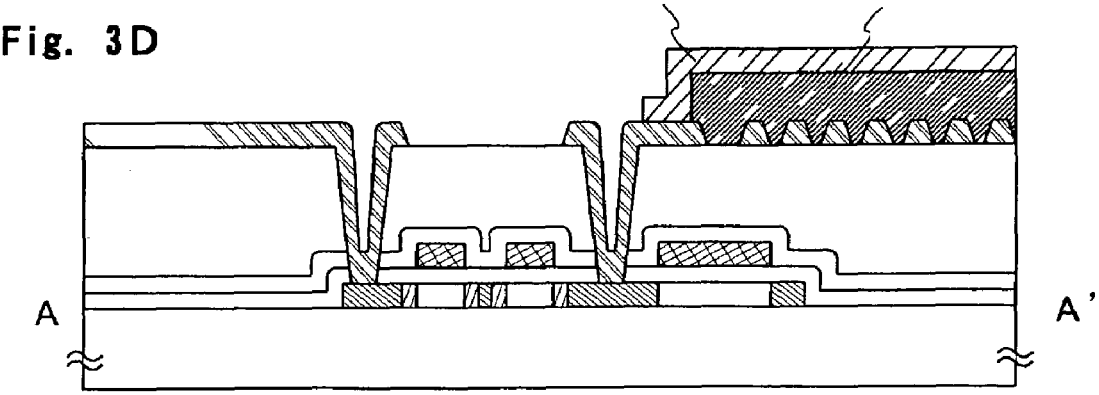
Figure 7:
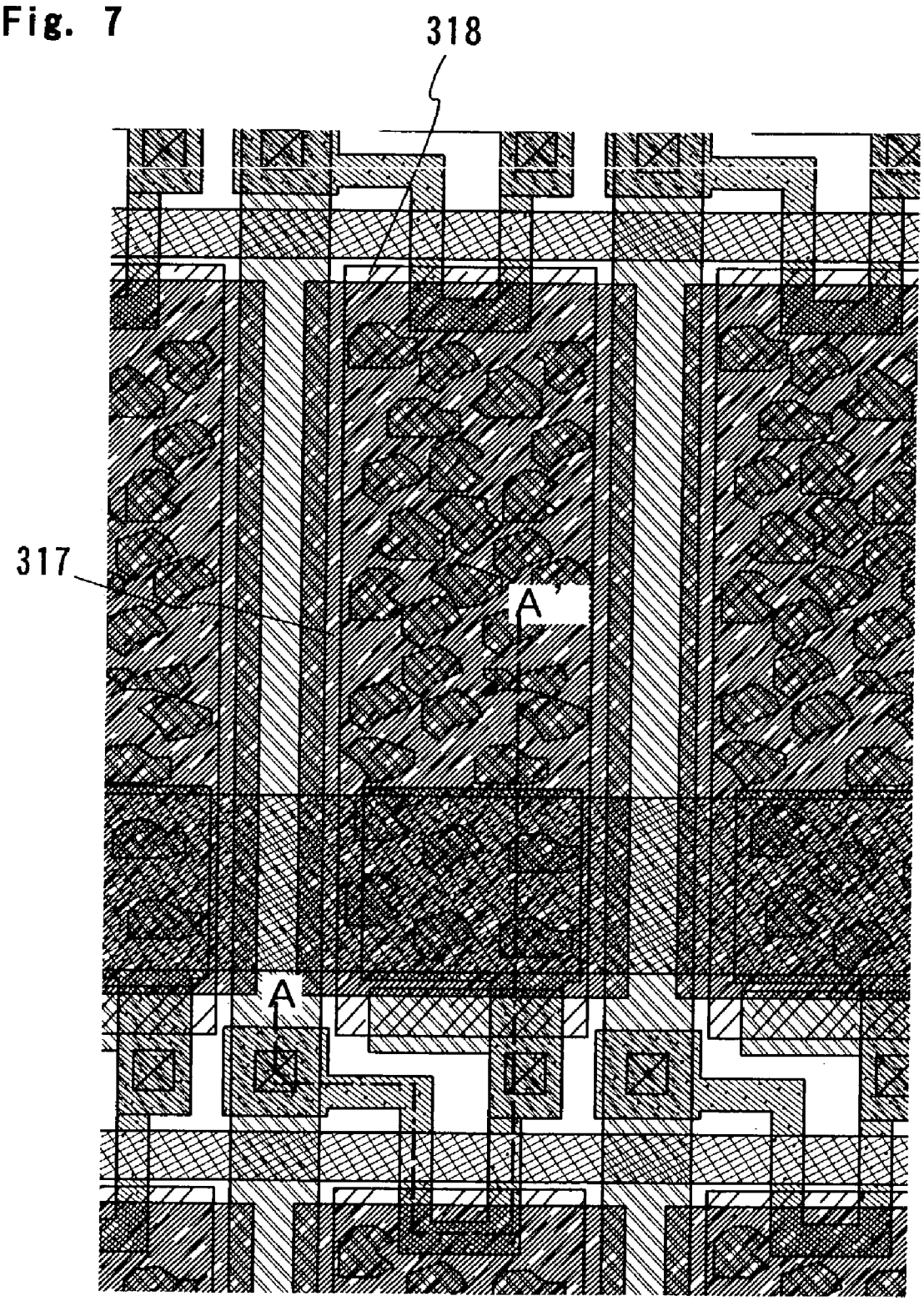
FIG. 7 is a diagram for illustrating a process of fabricating a liquid crystal display device of the present invention.

Next, the transparent conductive film of 120 nm in thickness (in this example, an indium tin oxide (ITO) film) is formed on the color filter 317 by a sputtering method and is then patterned into a rectangle shape by a photolithography. Subsequently, after performing a wet-etching treatment, it is subjected to a heat treatment in a clean oven at 250° C. for 60 minutes, thereby a transparent electrode 318 is performed (FIG. 3D). Here, the top view of the pixel portion is shown in FIG. 7. The cross-sectional profile of the pixel portion along the dotted line A-A' corresponds to the structure shown in FIG. 3D.

As shown in FIG. 7, by the way, transparent electrode 318 is formed over the reflectors 314 having randomly arranged islands through the color filter 317. In an area where the transparent electrode 318 and the reflectors 314 are overlapped, light is reflected on the reflectors 314. In another area where the reflectors 314 is not located, light is emitted toward the substrate 301 without reflecting on the reflectors 314.

As described above, therefore, the pixel portion including the n-channel type TFT having the double gate structure and the holding capacitor, and the driving circuit including both the n-channel type TFT and the p-channel type TFT, can be formed on the same substrate. In the specification, such a substrate is referred to as an active matrix substrate for the sake of convenience.

It is needles to say that the present example has been described as merely one of the examples and the present invention is not limited to the steps of the present example. For example, each conductive film may includes one selected from tantalum (Ta), titanium (Ti), molybdenum (Mo), tungsten (W), chromium (Cr), and silicon (Si). Alternatively, the above film may be an alloy film including a mixture of elements selected from these elements (typically, Mo—W alloy or Mo—Ta alloy). Furthermore, each of the insulating films may be a silicon oxide film, a silicon nitride film, a silicon oxynitride film, or a film including an organic material (e.g., polyimide, acryl, polyamide, polyimideamide, or benzocyclobutene (BCB))

According to the steps illustrated in the present example, as shown in FIG. 3D, the reflectors 314 and wirings 315, 316 can be simultaneously formed together using the wiring-pattern mask. Therefore, the reflecting electrodes can be divided into a plurality of islands on the insulating film without increasing the number of the photo masks to be required in the process of fabricating an active matrix substrate. Consequently, in the process of fabricating a transflective liquid crystal display device, the time required for the steps are reduced to contribute to a reduction in manufacturing costs and to an increase in yields.

Example 2

This embodiment concretely explains a method for manufacturing a transflective type liquid crystal display device different in the structure from that of Embodiment 1 with reference to FIGS. 8A to 10.

Figure 8A:
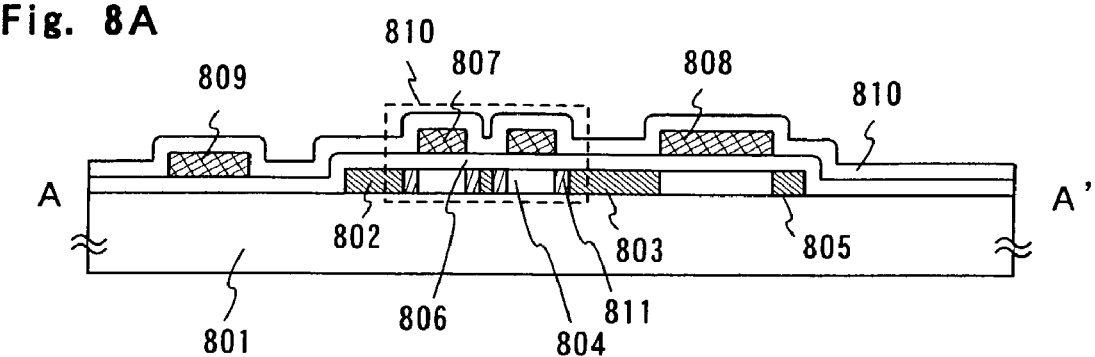
FIGS. 8A to 8D are diagrams for illustrating the steps in the process of fabricating a liquid crystal display device of the present invention.

At first, an amorphous semiconductor film is formed on a substrate 801 as shown in FIG. 8A. After crystallizing this, a semiconductor layer 805 is formed which is separated in an island form by patterning. Furthermore, on the semiconductor layer 805, a gate insulating film 806 is formed by an insulating film. Incidentally, the manufacturing method of up to forming the gate insulating film 806 is similar to that shown in example 1, and hence example 1 may be referred to. Similarly, after forming an insulating film covering the semiconductor layer 805, thermal oxidation is carried out to form a gate insulating film 806.

Then, a channel dope process is carried out over the entirely or selectively, to add a p-type or n-type impurity element at low concentration to a region which will become a TFT channel forming region.

A conductive film is formed on the gate insulating film 806. By patterning this, a wiring 809 which will become the electrode 807, a capacitor wiring 808 and a source line can be formed. Incidentally, the first conductive film in this embodiment is formed by laminating TaN (tantalum nitride) formed in a thickness of 50 to 100 nm and W (tungsten) formed in a thickness of 100 to 400 nm.

Although the conductive film is formed by the use of the laminated film of TaN and W in this embodiment, they are not especially limited, i.e. both may include an element selected from Ta, W, Ti, Mo, Al and Cu or an alloy or a compound material mainly containing the above elements. Otherwise, a semiconductor film that is represented by a polycrystal silicon film doped with an impurity element, such as phosphorus may be used.

Then, phosphorus is added at low concentration by use of the gate electrode 807 and capacitor wiring 808 as masks in a self-alignment manner. In the region added at low concentration, phosphorus concentration is controlled to $1\times10^{16}$ to $5\times10^{18}$ atom/cm$^3$, typically $3\times10^{17}$ to $3\times10^{18}$ atom/cm$^3$.

Next, a mask (not shown) is formed to add phosphorus at high concentration to form an impurity region with high concentration which will become a source region 802 or drain region 803. In this impurity region with high concentration, phosphorus concentration is controlled to $1\times10^{20}$ to $1\times10^{21}$ atom/cm$^3$ (typically $2\times10^{20}$ to $5\times10^{20}$ atom/cm$^3$). The semiconductor layer 805 in a region overlapped with the gate electrode 807 will become a channel-forming region 804. The region covered by the mask will become an impurity region with low concentration of LDD region 811. Furthermore, the region which is not covered by any of the gate electrode 807, the capacitor wiring 808 and the mask will become an impurity region with high concentration including a source region 802 and a drain region 803.

Meanwhile, because this embodiment forms p-channel TFTs to be used for a driver circuit formed on the same substrate as the pixels similarly to example 1, the region which will become n-channel TFTs is covered by a mask to add boron thereby forming a source or drain region.

Then, after removing the mask, a first insulating film 810 is formed covering the gate electrode 807, the capacitor wiring 808 and wiring (source line) 809. Herein, a silicon oxide film is formed in a film thickness of 50 nm, and a thermal process is carried out to activate the n-type or p-type impurity element added at respective concentrations in the semiconductor layer 805. Herein, thermal process is made at 850° C. for 30 minutes (FIG. 8A).

Figure 8B:
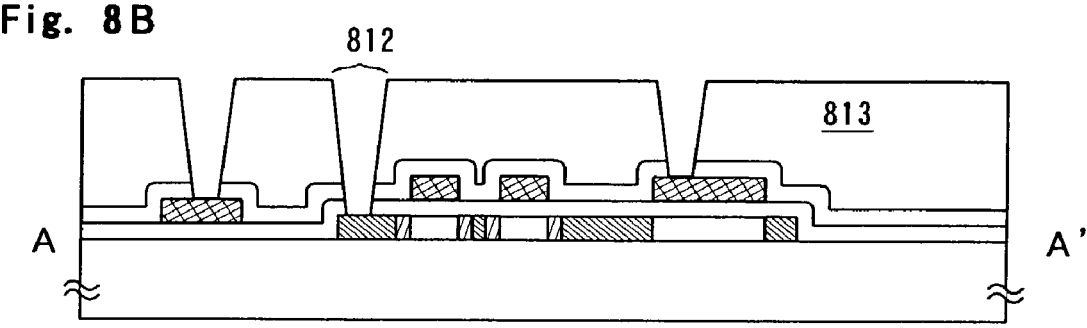

Then, after carrying out a hydrogenation process, a second insulating film 811 is formed of an organic resin material. By herein using an acryl film having a film thickness of 1 µm, the second insulating film 811 can be flattened in its surface. This prevents the influence of a step caused by the pattern formed in the layer beneath the second insulating film 811. Then, a mask is formed on the second insulating film 811 to form by etching a contact hole 812 reaching the semiconductor layer 805 (FIG. 8B). After forming the contact hole 812, the mask is removed away.

Next, a second conductive film is formed and patterned. Due to this, formed are, besides a reflection electrodes 814, a wiring 815 electrically connecting the wiring (source line) 809 and the source region of TFT 810, a wiring 816 connected electrically with the capacitor wiring 808, and a wiring 817 electrically connecting the drain region of TFT 810 and the transparent electrode 819 (In FIG. 8D, the connecting relation is not illustrated). The second conductive film formed herein is a reflective conductive film to form the reflectors of the invention, which can use aluminum or silver, or otherwise an alloy material based on these.

This embodiment uses a laminated film having a two-layer structure continuously formed, by sputtering, with a Ti film having 50 nm and an Si-contained aluminum film having 500 nm as the second conductive film.

Photolithography technique is applied for pattering to form reflectors 814 including a plurality of island-formed patterns and wirings 815, 816, 817. Also, a dry etching is applied for etching to carry out taper etching and anisotropic etching.

At first, a resist mask is formed to carry out a first etching process for taper etching. The first etching process is under first and second etching conditions. For etching, an ICP (Inductively Coupled Plasma) etching technique is suitably used. Using the ICP etching technique, the film can be etched to a desired taper form by properly controlling the etching condition (amount of power applied to a coil type electrode, amount of power applied to the electrode of the substrate side, an electrode temperature of the substrate side, etc.). A chlorine-based gas represented by $Cl_2$, $BCl_3$, $SiCl_4$, $CCl_4$ or the like, a fluorine-based gas represented by $CF_4$, $SF_6$, $NF_3$ or the like, or $O_2$ are can be suitably used as the etching gas.

This embodiment uses the ICP (Inductively Coupled Plasma) etching technique, as a first etching condition, wherein $BCl_3$, $Cl_2$ and $O_2$ are used for an etching gas. Etching is conducted with plasma caused by feeding a 500 W RF (13.56 MHz) power to a coil type electrode at a flow rate ratio of these gasses of 65/10/5 (sccm) under a pressure of 1.2 Pa. A 300 W RF (13.56 MHz) power is fed also to the substrate side (sample stage) to apply substantially a negative self-bias voltage. Under the first etching condition, the aluminum film containing Si is etched to make the first conductive layer at its end into a taper shape.

Thereafter, the etching condition is changed to the second etching condition without removing the mask. Using $CF_4$, $Cl_2$ and $O_2$ as etching gases, etching is conducted for nearly 30 seconds with plasma caused by feeding a 500 W RF (13.56 MHz) power to the coil type electrode at a flow rate ratio of these gasses of 25/25/10 (sccm) under a pressure of 1 Pa. A 20 W RF (13.56 MHz) power is fed also to the substrate side (sample stage) to apply substantially a negative self-bias voltage. Under the second etching condition having $CF_4$ and $Cl_2$ mixed together, the aluminum film containing Si and the Ti film are both etched in the same degree.

In this manner, by the first etching process, the second conductive film comprising the first and second conductive layers can be made into a taper shape.

Then, a second etching process for anisotropic etching is carried out without removing the resist mask. Using herein $BCl_3$ and $Cl_2$ for etching gases, etching is conducted with plasma caused by feeding a 300 W RF (13.56 MHz) power to the coil type electrode at a flow rate ratio of these gasses of 80/20 (sccm) under a pressure of 1 Pa. A 50 W RF (13.56 MHz) power is fed also to the substrate side (sample stage) to apply substantially a negative self-bias voltage.

Figure 8C:
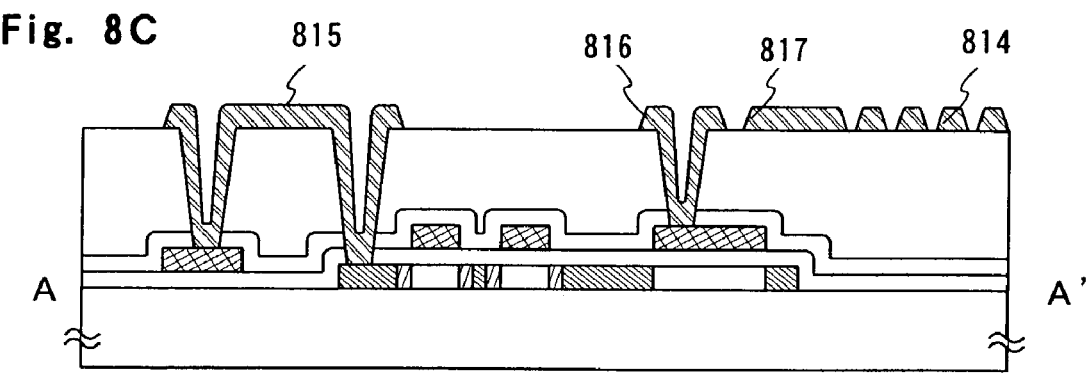
Figure 9:
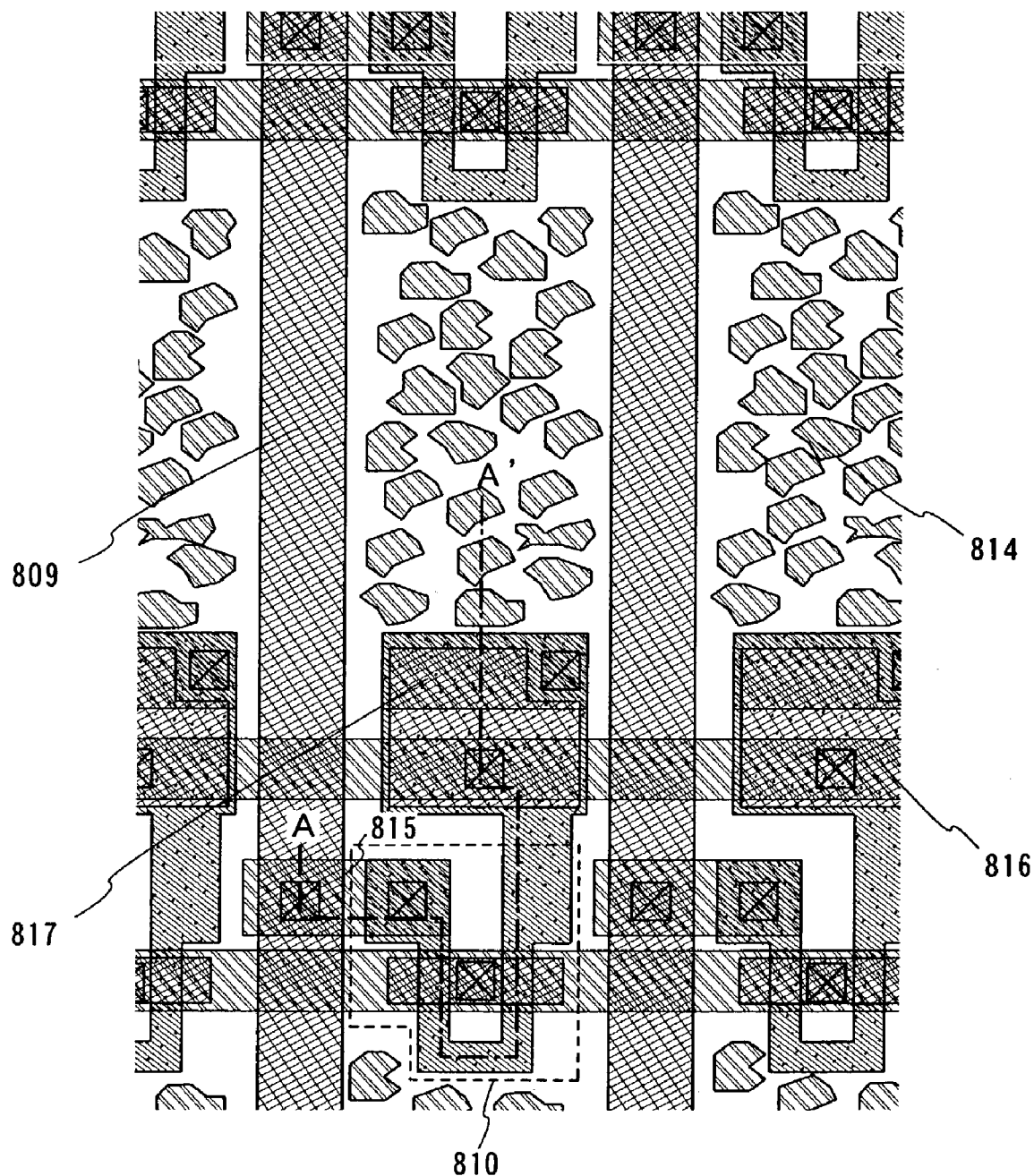
FIG. 9 is a diagram for illustrating a process of fabricating a liquid crystal display device of the present invention.

By the above, at a time that reflectors 814 and wirings 815, 816, 817 are formed, the resist is removed to obtain a structure shown in FIG. 8C. Incidentally, a pixel top view herein is shown in FIG. 9. In FIG. 9, the sectional view taken along the dotted line A-A' corresponds to FIG. 8C.

Then, a color filter 818 is formed on the reflectors 814. Publicly known materials can be used as the material for the color filter 818. In this embodiment, these materials are applied by spin coating to form the color filter having 1 µm thickness. Then, preliminary curing is conducted on hot plate at 80° C. for 5 minutes. And then, it is exposed with photomask to photolithography. After the processing, the substrate is immersed in a developing solution and developed by shaking. Tetramethylammonium hydroxide 0.2% solution is applied for the developing solution. After dipped in the developing solution for about 1 minute, the substrate is rinsed under flowing water. The residue of the color filter can be completely removed by conductive high-pressure jet washing. The color filter is only formed over the effective opening portion of corresponding pixels, except for voer the wiring 816 connected to the capacitor wiring 808. Though color filter is formed on a part of the wiring 817. However, it is not formed on the connecting portion of wiring 817 and the transparent electrode 819.

When the pattern is formed properly, the substrate is baked in a clean oven at 250° C. for 1 hour. Not illustrated here, above processing is done with three color filters, namely, red, blue, and green in this example.

After the three color filters are formed, overcoat material (not shown) can be applied thereon.

Figure 8D:
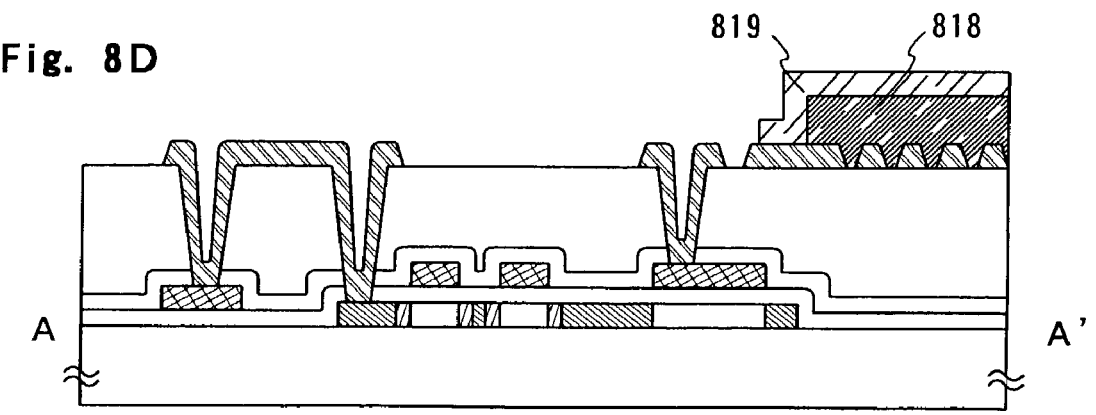
Figure 10:
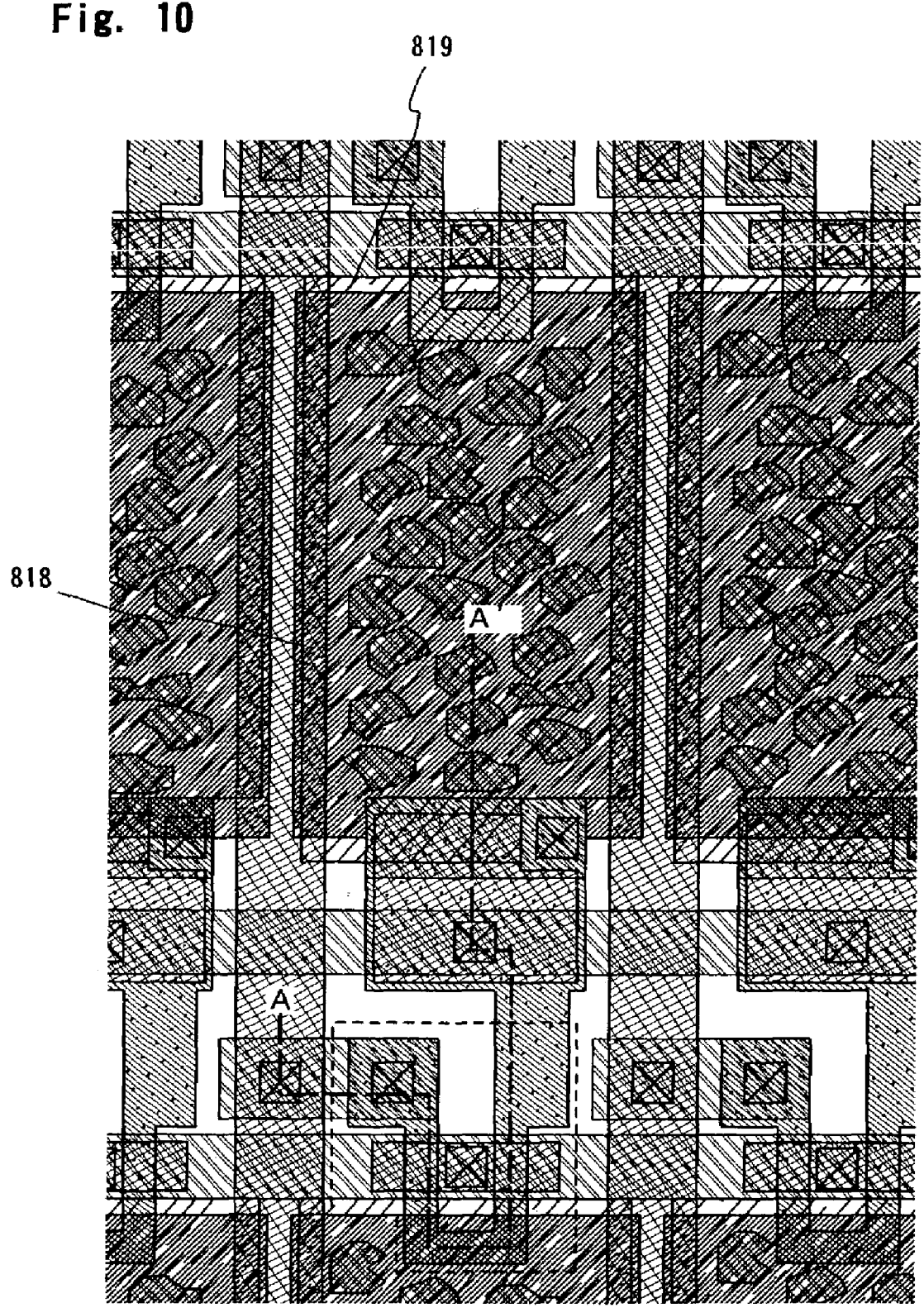
FIG. 10 is a diagram for illustrating a process of fabricating a liquid crystal display device of the present invention.

A transparent conductive film (here, indium tin oxide (ITO) film) is formed with a thickness of 120 nm by sputtering on the color filter 818, and patterned to have rectangular shape by photolithography technique. Then, after wet etching is performed thereon, a transparent electrode 819 is formed by conductive heat treatment in a clean oven at 250° C. for 60 minutes (FIG. 8D). A top view thereof is shown in FIG. 10. In FIG. 10, the cross-sectional view taken along the line A-A' corresponds to FIG. 8D.

Further, as shown in FIG. 10, the transparent electrode 819 is formed over the reflectors 814 formed randomly through the color filter 818. With this construction, light is reflected by the reflectors 814 in the place where the transparent electrode 819 and the reflectors 814 are overlapped, and in the potion where the reflectors 814 are not formed, light is not reflected by the reflectors 814 and emitted toward the substrate 801.

Accordingly, in this embodiment, the active matrix substrate is formed on which the pixel portion having an n-channel TFT of double gate structure and a holding capacitor, and the driving circuit having an n-channel TFT and the p-channel TFT are formed on the same substrate.

Meanwhile, according to the process shown in this example, it is possible to simultaneously form the reflectors 814 and wirings (815, 816, 817) by using a wiring pattern mask as shown in FIG. 8D. Consequently, a plurality of the reflectors can be formed separately in an island form without increasing the number of photo-masks required for fabricating the active matrix substrate. As a result, in the manufacture of a transflective liquid crystal display device, the process can

Example 3

This embodiment describes a process of manufacturing a liquid crystal display device from the active matrix substrate fabricated in example 1. The description is given with reference to cross-sectional view of FIG. 11.

After the active matrix substrate as illustrated in FIG. 3D is obtained in accordance with example 1, an oriented film 1117 is formed over the active matrix substrate of FIG. 3D and rubbing treatment is performed. In this example, after the oriented film 1117 is formed, spherical spacers 1121 are dispersed over the entire surface of the substrate in order to keep the distance between the substrates. The spherical spacers 1121 may be replaced by columnar spacers formed of an organic resin film such as an acrylic resin film patterned in desired portions.

A substrate 1122 is prepared next. On the substrate 1122, a counter electrode 1123 is formed from a transparent conductive film in the portion where a pixel portion will be formed. An oriented film 1124 is formed over the entire surface of the substrate 1122 and is a rubbing treatment is performed. Then, a counter substrate 1126 is obtained.

Figure 11:
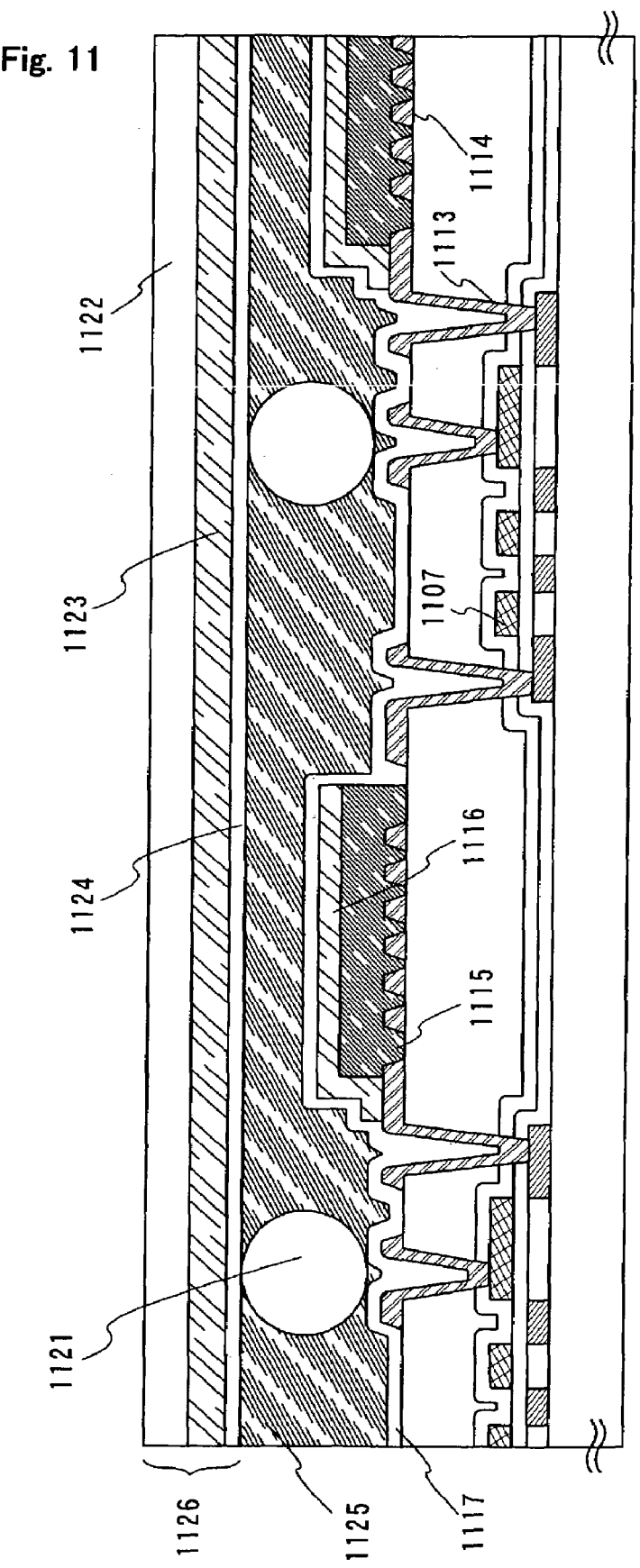
FIG. 11 is a diagram for illustrating a structure of a liquid crystal display device of the present invention.

Then, the counter substrate 1126 is bonded to the active matrix substrate on which the oriented film 1117 is formed, using a sealing member (not shown) The sealing member has filler mixed therein and the filler, together with the columnar spacers, keeps the uniform distance between the two substrates (preferably 2.0 to 3.0 µm) while they are bonded. Thereafter a liquid crystal material 1125 is injected between the substrates and a sealant (not shown) is used to completely seal the substrates. A publicly known liquid crystal material can be used. The transflective liquid crystal display device shown in FIG. 11 is thus completed. If necessary, the active matrix substrate or the counter substrate 1126 is cut into pieces of desired shapes. The display device may be appropriately provided with a polarizing plate using a publicly known technique. Then FPCs are attached to the substrate using a publicly known technique.

Figure 14:
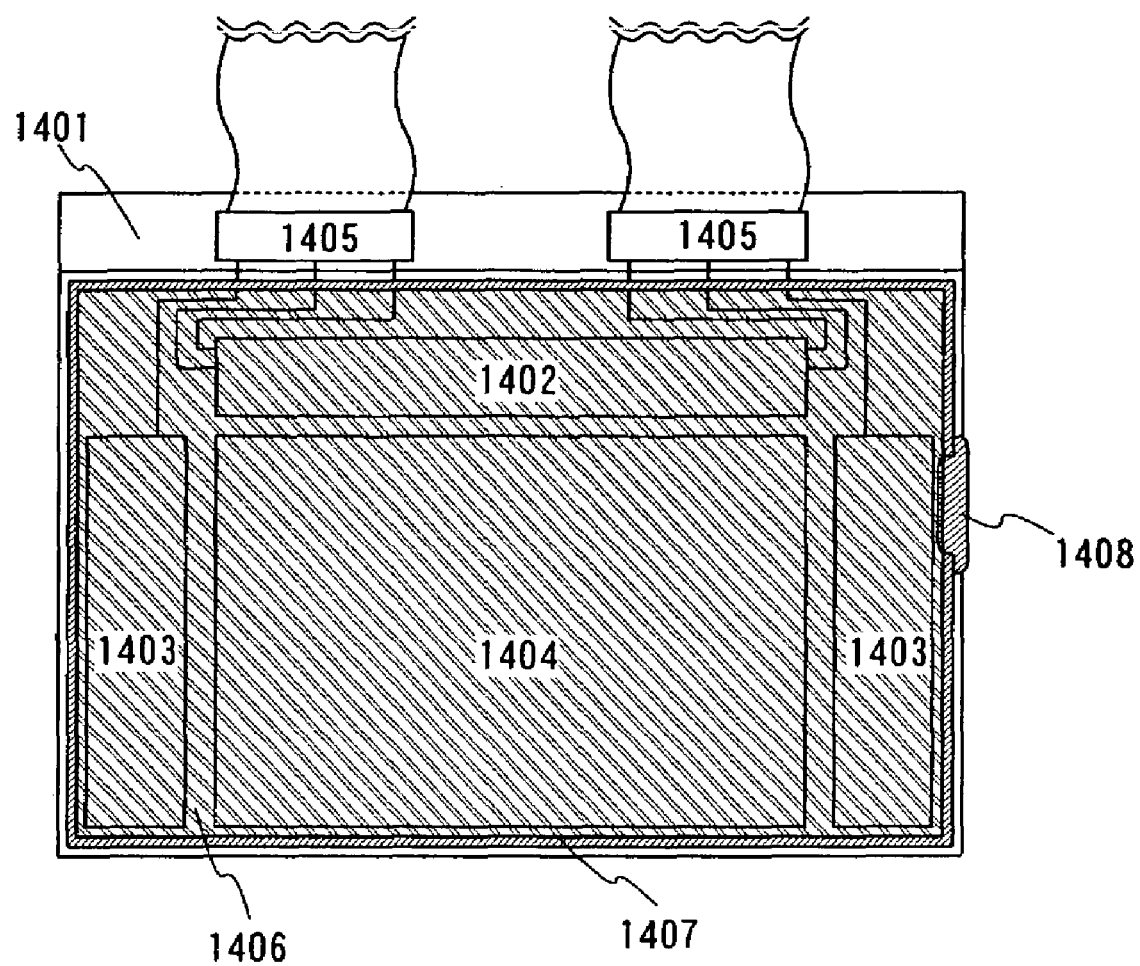
FIG. 14 is a diagram for illustrating an external view of a liquid crystal display device of the present invention.

The structure of the thus obtained liquid crystal module is described with reference to the top view in FIG. 14. A pixel portion 1404 is placed in the center of an active matrix substrate 1401. A source signal line driving circuit 1402 for driving source signal lines is positioned above the pixel portion 1404. Gate signal line driving circuits 1403 for driving gate signal lines are placed to the left and right of the pixel portion 1404. Although the gate signal line driving circuits 1403 are symmetrical with respect to the pixel portion in this example, the liquid crystal module may have only one gate signal line driving circuit on one side of the pixel portion. Of the above two options, a designer can choose the arrangement that suits better considering the substrate size or the like of the liquid crystal module. However, the symmetrical arrangement of the gate signal line driving circuits shown in FIG. 14 is preferred in terms of circuit operation reliability, driving efficiency, and the like.

Signals are inputted to the driving circuits from flexible print circuits (FPC) 1405. The FPCs 1405 are press-fit through an anisotropic conductive film or the like after opening contact holes in the interlayer insulating film and resin film and forming a connection electrode so as to reach the wiring lines arranged in given places of the substrate 1401. The connection electrode is formed from ITO in this example.

A sealing member 1407 is applied along its periphery around the driving circuits and the pixel portion. A counter substrate 1406 is bonded to the substrate 1401 while a spacer formed in advance on the active matrix substrate keeps the distance between the two substrates constant (the distance between the substrate 1401 and the opposed substrate 1406). A liquid crystal is injected through an area that is not coated with the sealing member 1407. The substrates are then sealed by a sealant 1408. A liquid crystal module is completed through the above processing. Although all of the driving circuits are formed on the substrate in the example shown here, several ICs may be used for some of the driving circuits. The active matrix type liquid crystal module is completed through the above steps.

Example 4

Figure 12:
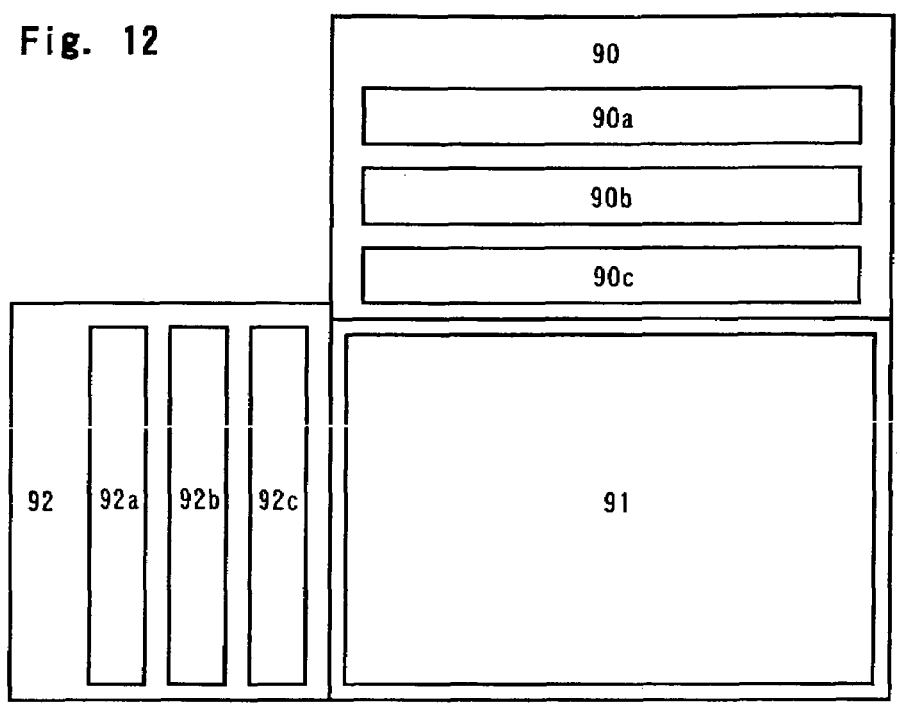
FIG. 12 is a diagram for illustrating a circuit configuration usable in the present invention.
Figure 13:
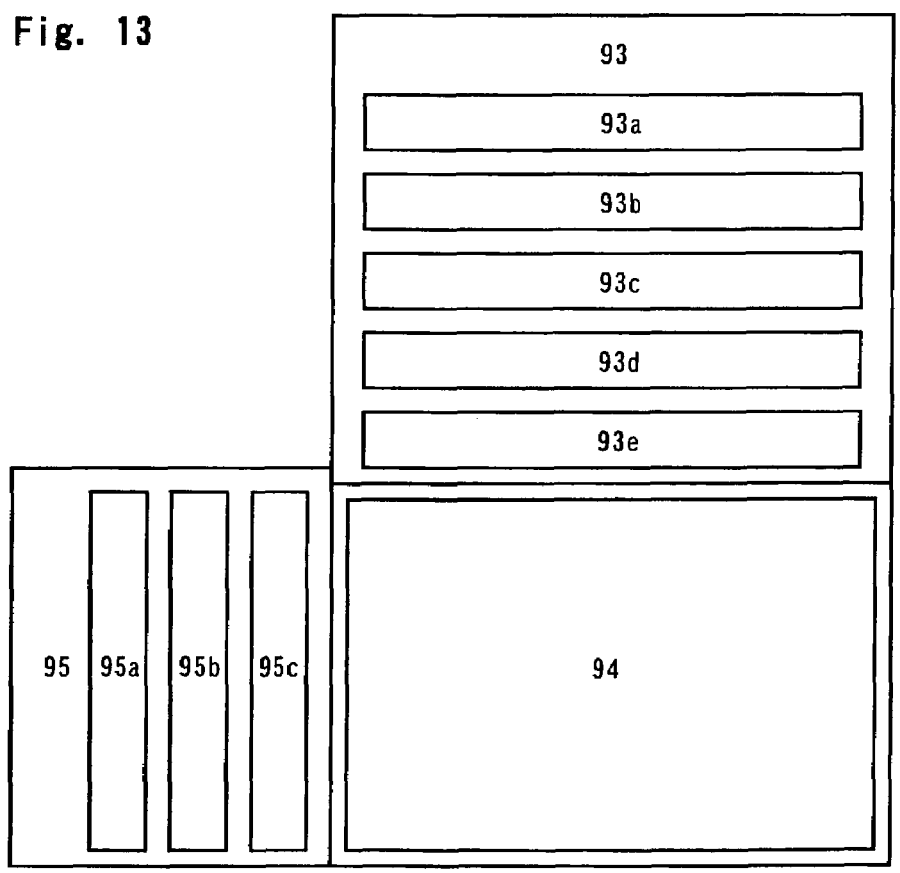
FIG. 13 is a diagram for illustrating a circuit configuration usable in the present invention.

FIGS. 12, 13 show block diagrams of an electro-optical device manufactured in accordance with the present invention. FIG. 12 shows a circuit structure for the device that is driven by analog driving. This example describes an electro-optical device having a source line driving circuit 90, a pixel portion 91, and a gate line driving circuit 92. The term of driving circuit herein collectively refers to a source line driving circuit and a gate line driving circuit.

The source line driving circuit 90 is provided with a shift register 90a, a buffer 90b, and a sampling circuit (transfer gate) 90c. The gate line driving circuit 92 is provided with a shift register 92a, a level shifter 92b, and a buffer 92c. If necessary, a level shifter circuit may be provided between the sampling circuit and the shift register.

In this embodiment, the pixel portion 91 includes a plurality of pixels, and each of the plural pixels has TFT elements.

Though not shown in the drawing, another gate line driving circuit may be provided in the other side of the gate line driving circuit 92 with the pixel portion 91 therebetween.

When the device is driven by digital driving, the sampling circuit is replaced by a latch (A) 93b and a latch (B) 93c as shown in FIG. 13. A source line driving circuit 93 is provided with a shift register 93a, the latch (A) 93b, the latch (B) 93c, a D/A converter 93d, and a buffer 93e. A gate line driving circuit 95 is provided with a shift register 95a, a level shifter 95b, and a buffer 95c. If necessary, a level shifter circuit may be provided between the latch (B) 93c and the D/A converter 93d.

The above structure is obtained by employing the manufacture process of any of example 1 or 2. Although this example describes only the structure of the pixel portion and the driving circuit, a memory circuit and a microprocessor circuit can also be formed when following the manufacture process of the present invention.

Example 5

The transflective liquid crystal display device formed by implementing the present invention can be used for various electro-optical devices. The present invention can be applied to all electric appliances in which the electro-optical device is built as a display medium.

Given as examples of an electric appliance that employs a liquid crystal display device manufactured in accordance with the present invention are video cameras, digital cameras, navigation systems, audio reproducing devices (such as car audio and audio components), laptop computers, game machines, portable information terminals (such as mobile computers, cellular phones, portable game machines, and electronic books), and image reproducing devices equipped with recording media (specifically, devices with a display device that can reproduce data in a recording medium such as a digital video disk (DVD) to display an image of the data). Specific examples of these electric appliance are shown in FIGS. 15A to 15H.

Figure 15A:
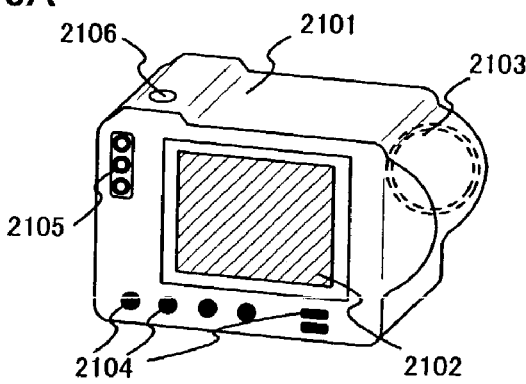
FIGS. 15A to 15F are diagrams for illustrating examples of an electric devices.

FIG. 15A shows a digital still camera, which is composed of a main body 2101, a display unit 2102, an image receiving unit 2103, operation keys 2104, an external connection port 2105, a shutter 2106, etc. The digital camera is completed by using the liquid crystal display device manufactured in accordance with the present invention for the display unit 2102.

Figure 15B:
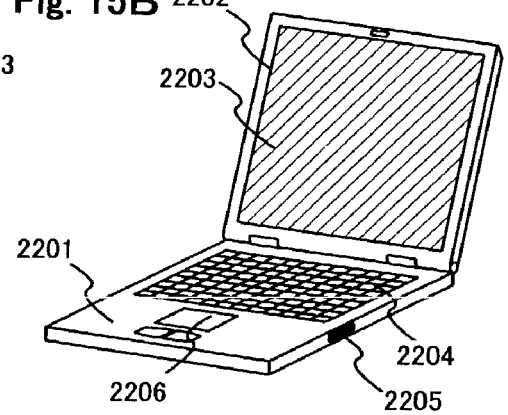

FIG. 15B shows a laptop computer, which is composed of a main body 2201, a case 2202, a display unit 2203, a keyboard 2204, an external connection port 2205, a pointing mouse 2206, etc. The laptop computer is completed by using the liquid crystal display device manufactured in accordance with the present invention for the display unit 2203.

Figure 15C:
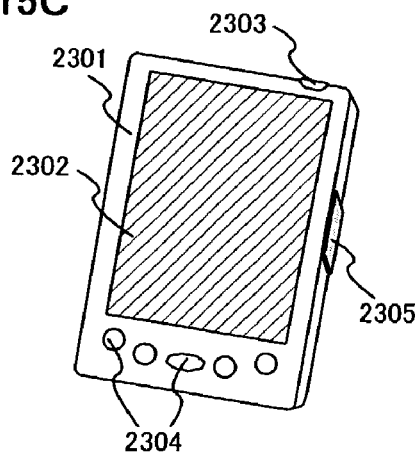

FIG. 15C shows a mobile computer, which is composed of a main body 2301, a display unit 2302, a switch 2303, operation keys 2304, an infrared port 2305, etc. The mobile computer is completed by using the liquid crystal display device manufactured in accordance with the present invention for the display unit 2302.

Figure 15D:
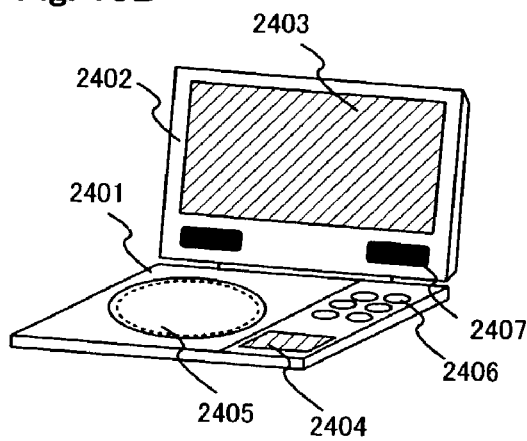

FIG. 15D shows a portable image reproducing device equipped with a recording medium (a DVD player, to be specific). The device is composed of a main body 2401, a case 2402, a display unit A 2403, a display unit B 2404, a recording medium (DVD or the like) reading unit 2405, operation keys 2406, speaker units 2407, etc. The display unit A 2403 mainly displays image information whereas the display unit B 2404 mainly displays text information. The portable image reproducing device is completed by using the liquid crystal display device manufactured in accordance with the present invention for the display units A 2403 and B 2404. The image reproducing device equipped with a recording medium also includes home-video game machines.

Figure 15E:
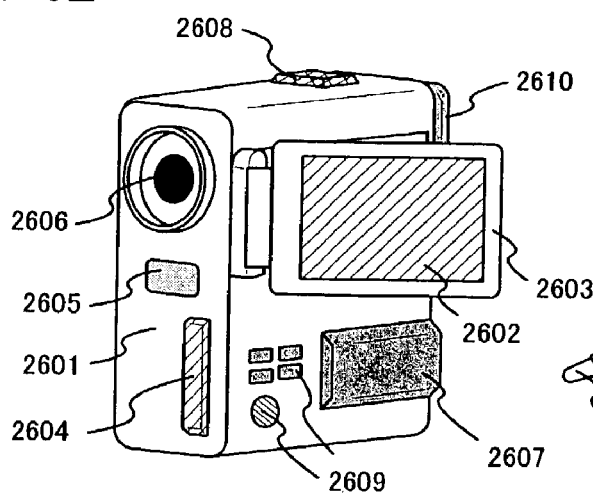

FIG. 15E shows a video camera, which is composed of a main body 2601, a display unit 2602, a case 2603, an external connection port 2604, a remote control receiving unit 2605, an image receiving unit 2606, a battery 2607, an audio input unit 2608, operation keys 2609, eye piece portion 2610 etc. The video camera is completed by using the liquid crystal display device manufactured in accordance with the present invention for the display unit 2602.

Figure 15F:
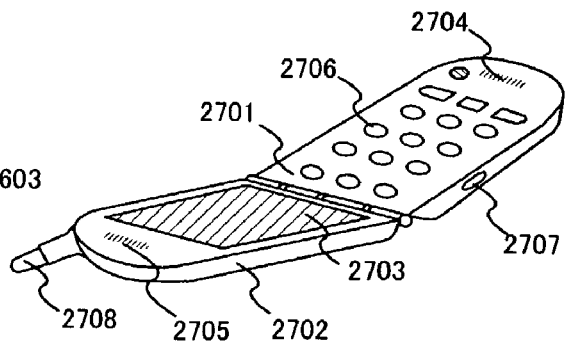
Figure 16A:
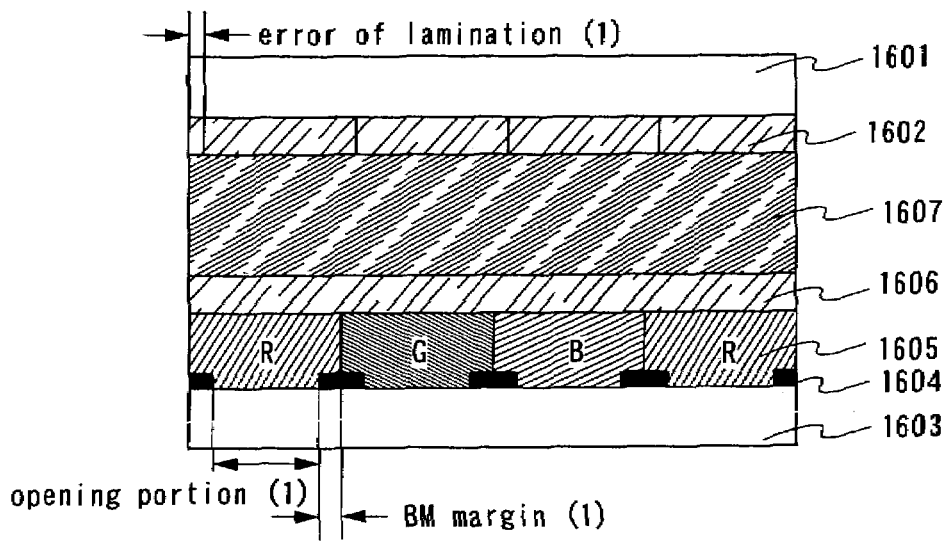
FIGS. 16A to 16C are diagrams for illustrating a related art.
Figure 16B:
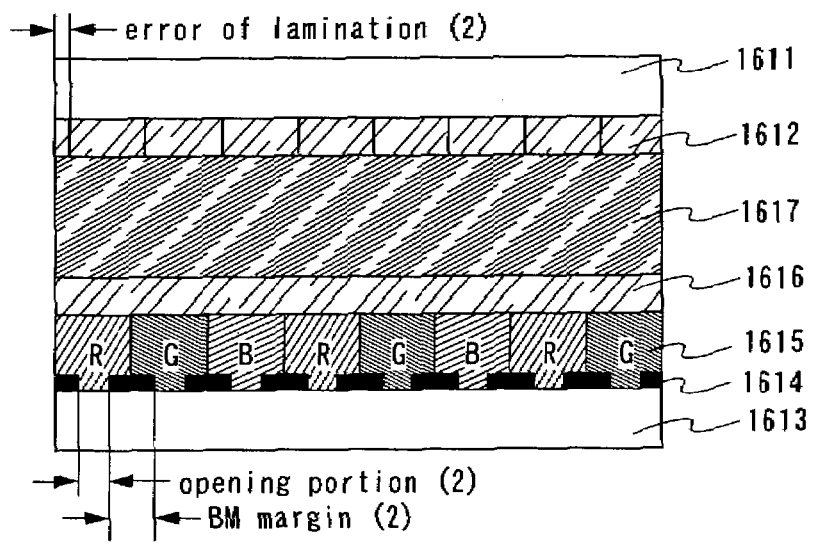
Figure 16C:
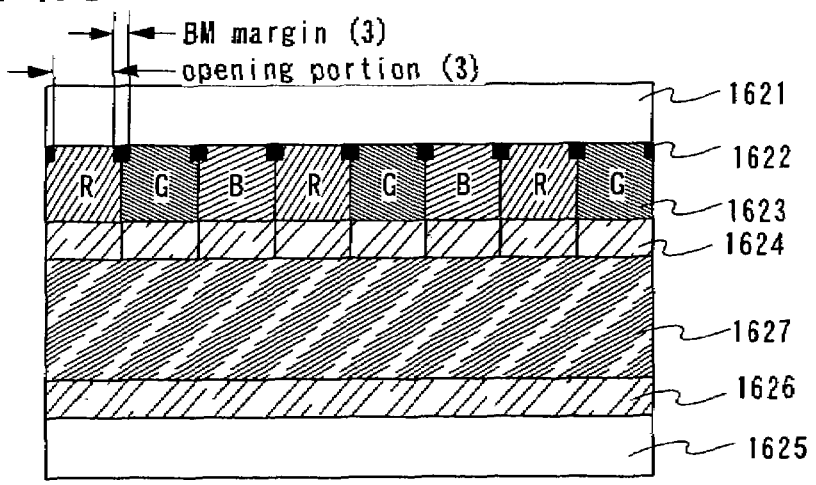
Figure 17A:
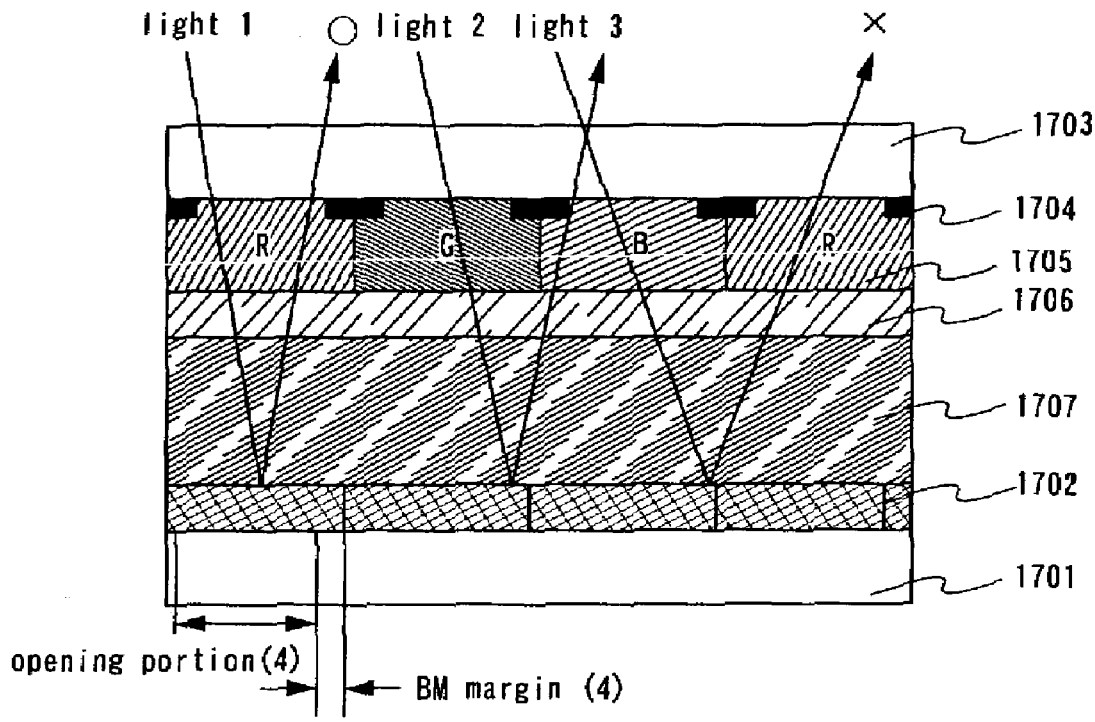
FIGS. 17A and 17B are diagrams for illustrating a related art.
Figure 17B:
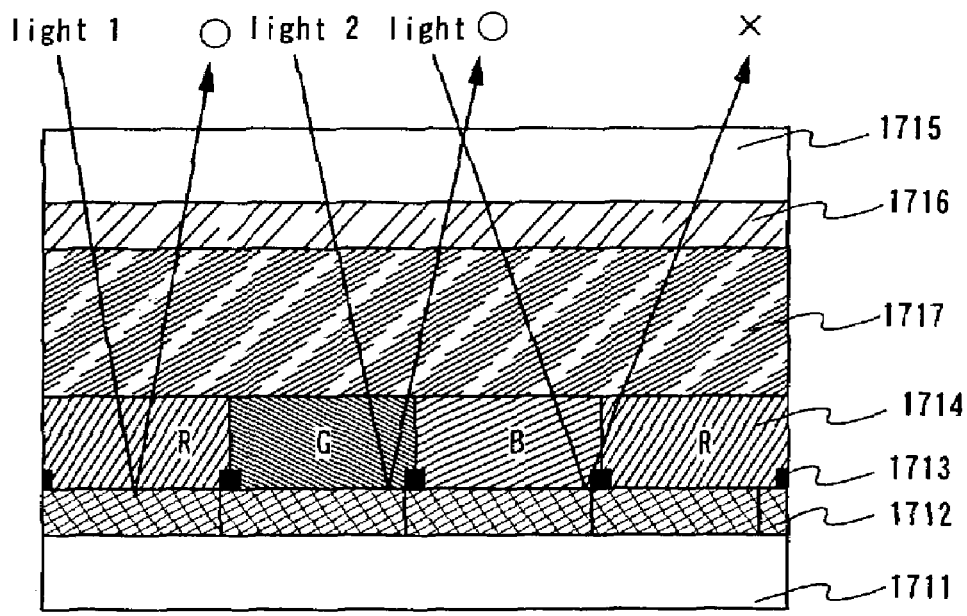

FIG. 15F shows a cellular phone, which is composed of a main body 2701, a case 2702, a display unit 2703, an audio input unit 2704, an audio output unit 2705, operation keys 2706, an external connection port 2707, an antenna 2708, etc. The cellular phone is completed by using the liquid crystal display device manufactured in accordance with the present invention for the display unit 2703. If the display unit 2703 displays white letters on black background, the cellular phone consumes less power.

As described above, the application range of the liquid crystal display device manufactured in accordance with the present invention is so wide that it is applicable to electric appliances of any field. The electric appliances of this example can be completed by using the liquid crystal display device formed by implementing examples 1 to 4.

Accordingly, by implementing the present invention, wirings including a reflective conductive film and a plurality of island patterns which will become reflectors can be concurrently formed together in the process of fabricating a transflective liquid crystal display device. In the present invention, furthermore, a transparent electrode formed from a transparent conductive film is formed over the reflectors through a color filter. Therefore, the reflectors improve the visibility of a display without increasing the number of the steps in the fabricating process, and also the arrangement of the color filter can prevent an image from being displaced or blurred without increasing the capacitance. Consequently, the fabrication of a liquid crystal device having a high quality and a substantial cost-cutting can be attained.

What is claimed is:

1. A liquid crystal display device including a plurality of pixels, each pixel comprising:
   a thin film transistor over a substrate;
   an insulating film formed over the thin film transistor;
   a plurality of reflectors formed on and in contact with the insulating film;
   a wiring on and in contact with the insulating film;
   a color filter formed over the plurality of reflectors and the insulating film; and
   a transparent conductive film formed on and in contact with the color filter,
   wherein the wiring is electrically connected to the thin film transistor through a contact hole of the insulating film,
   wherein the transparent conductive film is electrically connected to the thin film transistor through the wiring,
   wherein the color filter is in contact with the insulating film under the transparent conductive film, and
   wherein the thin film transistor and the transparent conductive film are electrically connected by the wiring.

2. A liquid crystal display device comprising:
   a thin film transistor formed on an insulating surface;
   an insulating film formed over the thin film transistor;
   a wiring and a plurality of reflectors formed on and in contact with the insulating film;
   a color filter formed over the plurality of reflectors and the insulating film; and
   a transparent conductive film formed on and in contact with the color filter so as to overlap the plurality of reflectors,
   wherein the wiring is electrically connected to the thin film transistor through a contact hole of the insulating film,
   wherein the transparent conductive film is electrically connected to the thin film transistor through the wiring,
   wherein the thin film transistor and the transparent conductive film are electrically connected to the wiring therebetween, and
   wherein the color filter is in contact with the insulating film under the transparent conductive film.

3. A liquid crystal display device according to claim 1, wherein a ratio of an area occupied by the plurality of reflectors is 50 to 90% of an area occupied by the transparent conductive film.

4. A liquid crystal display device according to claim 2, wherein a ratio of an area occupied by the plurality of reflectors is 50 to 90% of an area occupied by the transparent conductive film.

5. A liquid crystal display device including a plurality of pixels, each pixel comprising:
   a first substrate;
   a thin film transistor over the first substrate;
   an insulating film over the first substrate;
   a wiring formed on and in contact with the insulating film;
   a plurality of reflectors formed on and in contact with the insulating film;
   a color filter formed over the plurality of reflectors and the insulating film;
   a first transparent conductive film on and in contact with the color filter;
   a liquid crystal over the first transparent conductive film; and
   a second transparent conductive film over the liquid crystal,
   wherein the wiring is electrically connected to the thin film transistor through a contact hole of the insulating film, wherein the transparent conductive film is electrically connected to the thin film transistor through the wiring,
wherein the first transparent conductive film and the wiring are electrically connected to each other, and
wherein the color filter is in contact with the insulating film under the first transparent conductive film.

6. A liquid crystal display device comprising:
a first substrate;
a thin film transistor over the first substrate;
an insulating film over the thin film transistor;
a wiring formed on and in contact with the insulating film;
a plurality of reflectors formed on and in contact with the insulating film;
a color filter formed over the plurality of reflectors and the insulating film;
a first transparent conductive film on and in contact with the color filter so as to overlap the plurality of reflectors;
a liquid crystal over the first transparent conductive film;
a second transparent conductive film over the liquid crystal; and
a second substrate over the second transparent conductive film,
wherein the wiring is electrically connected to the thin film transistor through a contact hole of the insulating film,
wherein the transparent conductive film is electrically connected to the thin film transistor through the wiring,
wherein the thin film transistor and the first transparent conductive film are electrically connected to the wiring therebetween, and
wherein the color filter is in contact with the insulating film under the first transparent conductive film.

7. A liquid crystal display device according to claim 5,
wherein a ratio of an area occupied by the plurality of reflectors is 50 to 90% of an area occupied by the transparent conductive film.

8. A liquid crystal display device according to claim 6,
wherein a ratio of an area occupied by the plurality of reflectors is 50 to 90% of an area occupied by the transparent conductive film.

9. A liquid crystal display device according to claim 1,
wherein each of the plurality of reflectors has an end portion with a taper angle of 5 to 60°.

10. A liquid crystal display device according to claim 2,
wherein each of the plurality of reflectors has an end portion with a taper angle of 5 to 60°.

11. A liquid crystal display device according to claim 5,
wherein each of the plurality of reflectors has an end portion with a taper angle of 5 to 60°.

12. A liquid crystal display device according to claim 6,
wherein each of the plurality of reflectors has an end portion with a taper angle of 5 to 60°.

13. A liquid crystal display device according to claim 1,
wherein a portion of the color filter that is in contact with the insulating surface under the transparent conductive film is located between at least two of the plurality of reflectors.

14. A liquid crystal display device according to claim 2,
wherein a portion of the color filter that is in contact with the insulating film under the transparent conductive film is located between at least two of the plurality of reflectors.

15. A liquid crystal display device according to claim 5,
wherein a portion of the color filter that is in contact with the insulating film under the transparent conductive film is located between at least two of the plurality of reflectors.

16. A liquid crystal display device according to claim 6,
wherein a portion of the color filter that is in contact with the insulating film under the transparent conductive film is located between at least two of the plurality of reflectors.

17. A liquid crystal display device according to claim 1,
wherein a portion of the insulating film in contact with the plurality of reflectors, the wiring, and the color filter is continuous.

18. A liquid crystal display device according to claim 5,
wherein a portion of the insulating film in contact with the plurality of reflectors, the wiring, and the color filter is continuous.

* * * * *